US009369695B2

(12) United States Patent
Masuda

(10) Patent No.: US 9,369,695 B2
(45) Date of Patent: Jun. 14, 2016

(54) METHOD AND APPARATUS FOR THREE-DIMENSIONAL MEASUREMENT AND IMAGE PROCESSING DEVICE

(71) Applicant: FUJIFILM Corporation, Tokyo (JP)

(72) Inventor: Tomonori Masuda, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 13 days.

(21) Appl. No.: 14/577,411

(22) Filed: Dec. 19, 2014

(65) Prior Publication Data
US 2015/0103148 A1 Apr. 16, 2015

Related U.S. Application Data

(63) Continuation of application No. PCT/JP2013/065670, filed on Jun. 6, 2013.

(30) Foreign Application Priority Data

Jun. 29, 2012 (JP) ................................. 2012-146469

(51) Int. Cl.
H04N 13/00 (2006.01)
G06T 9/20 (2006.01)
G06T 7/00 (2006.01)
H04N 13/02 (2006.01)
G01C 3/06 (2006.01)
G01C 11/02 (2006.01)
G01C 11/06 (2006.01)
G03B 35/00 (2006.01)
G01B 11/02 (2006.01)

(52) U.S. Cl.
CPC .......... *H04N 13/0246* (2013.01); *G01B 11/022* (2013.01); *G01C 3/06* (2013.01); *G01C 11/02* (2013.01); *G01C 11/06* (2013.01); *G03B 35/00* (2013.01); *G06T 7/002* (2013.01); *G06T 7/0075* (2013.01); *H04N 13/0239* (2013.01); *G06T 2207/10021* (2013.01); *G06T 2207/10028* (2013.01)

(58) Field of Classification Search
None
See application file for complete search history.

(56) References Cited

U.S. PATENT DOCUMENTS 5,680,474 A * 10/1997 Iijima ................... G06T 7/0022
345/419
8,077,965 B2 * 12/2011 Kakinami .............. G01C 11/00
340/435

(Continued)

FOREIGN PATENT DOCUMENTS

JP          6-195445 A    7/1994
JP       2005-241323 A    9/2005

(Continued)

OTHER PUBLICATIONS

International Search Report, issued in PCT/JP2013/065670, dated Aug. 20, 2013.
Written Opinion of the International Searching Authority, issued in PCT/JP2013/065670, dated Aug. 20, 2013.

*Primary Examiner* — Jay Patel
*Assistant Examiner* — Reza Aghevli
(74) *Attorney, Agent, or Firm* — Birch, Stewart, Kolasch & Birch, LLP

(57) ABSTRACT

A three-dimensional measurement apparatus comprises first and second imaging units, with a baseline length, a feature point detector, a corresponding point detector, a rotation matrix calculator, a translation matrix calculator, an epipolar line calculator, an evaluator, and a data calculator. The rotation matrix calculator and the translation matrix calculator calculate matrices representing directions of rotation and translation between the imaging positions A and B. The epipolar line calculator calculates an epipolar line, which is supposed to be passing through a specific feature point, on an image based on the rotation and translation matrices, and an assumed virtual translation distance. The evaluator evaluates whether the epipolar lines, calculated based on different virtual translation distances, pass through a corresponding point. The data calculator calculates three-dimensional data of an object with the use of the virtual translation distance assumed for calculating the epipolar line evaluated to be passing through the specific feature point.

17 Claims, 21 Drawing Sheets

(56) References Cited

U.S. PATENT DOCUMENTS

| | | | |
|---|---|---|---|
| 8,275,195 B2 * | 9/2012 | Francini | G06K 9/209 348/413.1 |
| 2008/0137940 A1 | 6/2008 | Kakinami et al. | |
| 2009/0207235 A1 | 8/2009 | Francini et al. | |
| 2011/0249117 A1 * | 10/2011 | Yoshihama | G06T 7/0075 348/135 |

FOREIGN PATENT DOCUMENTS

| | | |
|---|---|---|
| JP | 2007-263669 A | 10/2007 |
| JP | 2009-517683 A | 4/2009 |
| JP | 2011-232330 A | 11/2011 |
| JP | 2012-122911 A | 6/2012 |
| WO | WO 2006/090735 A1 | 8/2006 |

* cited by examiner

METHOD AND APPARATUS FOR THREE-DIMENSIONAL MEASUREMENT AND IMAGE PROCESSING DEVICE

CROSS-REFERENCE TO RELATED APPLICATIONS

This application is a Continuation of PCT International Application No. PCT/JP2013/065670 filed on Jun. 6, 2013, which claims priority under 35 U.S.C. §119(a) to Japanese Patent Application No. 2012-146469, filed Jun. 29, 2012. Each of the above application(s) is hereby expressly incorporated by reference, in its entirety, into the present application.

BACKGROUND OF THE INVENTION

1. Field of the Invention

The present invention relates to a method and an apparatus for three-dimensional measurement and an image processing device, for calculating three-dimensional data of an object from taken images.

2. Description Related to the Prior Art

A three-dimensional measurement apparatus that calculates three-dimensional data (for example, dimensions) of an object based on two images of the object taken from two different image capture positions is known. The three-dimensional measurement apparatus is composed of, for example, two cameras, a processing device, and the like. The two cameras are disposed with a predetermined space (hereinafter referred to as the baseline length) from each other in a left-right direction. The processing device calculates the three-dimensional data based on the images, with parallax, taken with the two cameras.

For the three-dimensional measurement, the two images need to have parallax and contain the same object. For example, images taken with a stereo camera having two taking lenses may be used. Accuracy in measuring the three-dimensional data with the three-dimensional measurement apparatus depends on a relationship between the scale of the object and the baseline length. In a case where the scale of the object is large relative to the baseline length of the stereo camera, the obtained three-dimensional data may be unreliable due to a large error. For this reason, a long baseline length is necessary for measuring the three-dimensional data of an object with the relatively large scale (e.g. a building) with high accuracy. For example, a three-dimensional measurement apparatus disclosed in Japanese Patent Laid-Open Publication No. 2007-263669 constitutes a huge stereo camera as a whole with the use of two cameras mounted on a car.

It is necessary to measure or specify the baseline length accurately to perform the three-dimensional measurement with high accuracy. Normally, the stereo camera is precisely calibrated in advance at the time of manufacture, to achieve the predetermined baseline length. However, it is difficult to measure the baseline length accurately or to adjust the baseline length accurately to the predetermined value in the case where the two cameras are used to constitute the huge stereo camera as described in the Japanese Patent Laid-Open Publication No. 2007-263669. For this reason, the Japanese Patent Laid-Open Publication Nos. 2007-263669 and 2005-241323 disclose calibration methods for accurately measuring the baseline length in advance.

Recently, a three-dimensional measurement apparatus which measures the three-dimensional data with high accuracy with a stereo camera having a short baseline length has been known. The three-dimensional data is measured based on the images of the object taken from two image capture positions. However, a three-dimensional measurement apparatus disclosed in U.S. Patent Application Publication No. 2011/0249117 (corresponding to Japanese Patent Laid-Open Publication No. 2011-232330) needs to take an image of a reference object having known shape and dimensions together with the object whose three-dimensional data is to be measured, to obtain the distance between the two image capture positions. Suppose the stereo camera at the first image capture position and the stereo camera at the second image capture position constitute a huge stereo camera as a whole, the distance between the two image capture positions corresponds to the baseline length of the huge stereo camera. This three-dimensional measurement apparatus is similar to those disclosed in the Japanese Patent Laid-Open Publication Nos. 2007-263669 and 2005-241323 in that the baseline length needs to be a known value.

In the case where the two cameras are used to constitute the huge stereo camera having a long baseline length (distance between the two cameras) to perform the three-dimensional measurement, the baseline length needs to be measured or calibrated with high accuracy in advance as disclosed in the Japanese Patent Laid-Open Publication Nos. 2007-263669 and 2005-241323. If the positions of the cameras are moved to place the object properly in the imaging fields, complicated recalibration is necessary. For example, in a case where the two cameras are mounted on a car as disclosed in the Japanese Patent Laid-Open Publication No. 2007-263669, the direction of the car needs to be changed to image the object properly with the two cameras. In addition, the positions of the cameras need to be changed in case of a narrow road or no-entry street.

Carrying the huge stereo camera with the long baseline length without it being mounted on the car is not practical because the stereo camera is too huge. In the case where the two cameras are carried separately, it is nearly impossible to rearrange them at the distance of the predetermined baseline length from each other without calibration. Thus, the huge stereo camera with the long baseline length is inconvenient because re-calibration is required in many circumstances.

In the case where the normal-sized stereo camera with the short baseline length is used to perform the three-dimensional measurement, it is possible to carry the reference object and place the reference object at an appropriate position to take an image of the object as described in the U. S. Patent Application Publication No. 2011/0249117, but it is inconvenient. For example, the reference object needs to be placed not to interfere with the three-dimensional measurement of the object. The three-dimensional measurement may not be performed in a case where the reference object cannot be placed properly with the object in the imaging field, for example, when the dimensions of the object situated at an elevated position are necessary. In addition, it is difficult to select the shape and the material of the reference object which enables the calculation of the baseline length of the huge stereo camera with high accuracy irrespective of the imaging circumstances.

Thus, the conventional apparatus requires the calibration that makes the operations complicated. The three-dimensional measurement cannot be performed with high accuracy without the calibration and the accurate measurement of the baseline length.

SUMMARY OF THE INVENTION

An object of the present invention is to provide a method and an apparatus for three-dimensional measurement and an image processing device, capable of easy and highly accurate three-dimensional measurement.

The three-dimensional measurement apparatus according to the present invention comprises a first imaging unit for imaging an object, a second imaging unit, a feature point detector, a corresponding point detector, a rotation matrix calculator, a translation matrix calculator, an epipolar line calculator, an evaluator, and three-dimensional data calculator. The second imaging unit is disposed at a predetermined baseline length from the first imaging unit. The second imaging unit images at least a part of the object imaged with the first imaging unit. The feature point detector detects feature points in at least one of two images of the object taken from a first image capture position with the first and second imaging units. The corresponding point detector detects corresponding points in at least one of two images of the object taken from a second image capture position with the first and second imaging units. The second image capture position is different from the first image capture position. The corresponding points correspond to the feature points. The rotation matrix calculator calculates a rotation matrix representing angle and direction of rotation of the first or second imaging unit at the second image capture position relative to the first or second imaging unit at the first image capture position. The translation matrix calculator calculates a translation matrix representing a translation direction of the first or second imaging unit at the second image capture position relative to the first or second imaging unit at the first image capture position. The epipolar line calculator calculates an epipolar line based on a relative positional relationship between each of the imaging units at the first and second image capture positions. The relative positional relationship is determined by a first rotation matrix, a first translation matrix, and a first virtual translation distance. The first rotation matrix is calculated by the rotation matrix calculator based on the feature points and the corresponding points. The first translation matrix is calculated by the translation matrix calculator based on the feature points and the corresponding points. The first virtual translation distance is an arbitrarily assumed distance between each of the imaging unit taking the image in which the feature points are detected and the imaging unit taking the image in which the corresponding points are detected. The epipolar line is a projection of a direction of line of sight from the imaging unit at the first image capture position to the specific feature point onto the image taken from the second image capture position. The evaluator evaluates whether each of the epipolar lines passes through the corresponding point corresponding to the feature point. The epipolar lines are calculated with the different first virtual translation distances. The three-dimensional data calculator calculates three-dimensional data of the object with the use of the first virtual translation distance assumed for calculating the epipolar line passing through the specific feature point.

It is preferred that the epipolar line calculator calculates the epipolar line based on a second rotation matrix, a second translation matrix, and a second virtual translation distance. The second rotation matrix represents angle and direction of rotation of the imaging unit, at the second image capture position, taking the image for calculating the epipolar line, relative to the imaging unit, at the first image capture position, taking the image in which the feature points are detected. The second translation matrix represents a translation direction. The second virtual translation distance represents a translation distance containing an assumption of the first virtual translation distance.

It is preferred that the evaluator calculates the coincidence with the feature point along the epipolar lines and evaluates, based on the coincidence, whether the epipolar line passes through the corresponding point corresponding to the feature point.

It is preferred that the three-dimensional data calculator calculates the three-dimensional data of the object with the use of the virtual translation distance assumed for calculating the epipolar line containing a point with the highest coincidence.

It is preferred that the corresponding point detector detects the corresponding point on the image for calculating the epipolar line. The corresponding point corresponds to the specific feature point, through which the epipolar line is supposed to pass. The evaluator evaluates whether the epipolar line passes through the corresponding point based on distances from the epipolar lines to the corresponding point corresponding to the specific feature point.

It is preferred that the rotation matrix calculator and the translation matrix calculator recalculate the first rotation matrix and the first translation matrix with a changed condition in a case where the evaluator evaluates that none of the epipolar lines passes through the corresponding point corresponding to the specific feature point.

It is preferred that the corresponding point detector redetects the corresponding points, and the rotation matrix calculator and the translation matrix calculator recalculate the first rotation matrix and the first translation matrix based on the redetected corresponding points.

It is preferred that the corresponding point detector changes the condition in a case where the corresponding points are redected, and changing the condition includes any one of changing size of the image containing the feature point used for detecting the corresponding point, changing a scaling factor, changing the angle of rotation, and changing a combination of the feature points used for detecting the corresponding points.

It is preferred that the feature point detector redetects the feature points, and the rotation matrix calculator and the translation matrix calculator recalculate the first rotation matrix and the first translation matrix based on the redetected feature points.

It is preferred that the three-dimensional data calculator calculates the three-dimensional data with a method not using the epipolar line in a case where the first rotation matrix indicates that the first image capture position and the second image capture position are not rotated.

It is preferred that the three-dimensional data calculator compares the three-dimensional data calculated based on the first virtual translation distance with the three-dimensional data calculated based on a third virtual translation distance representing a distance between the imaging units at the first and second image capture positions, different from the distance represented by the first virtual translation distance. The third virtual translation distance is determined by an assumption of the first virtual translation distance. The three-dimensional data calculator calculates the first virtual translation distance and the three-dimensional data which make a difference between the three-dimensional data calculated using the first virtual translation distance and the three-dimensional data calculated using the third virtual translation distance less than or equal to a predetermined threshold value.

It is preferred that the three-dimensional data calculator uses the first rotation matrix and the first translation matrix calculated using the images of an arbitrary combination out of the four images taken from the first and second image capture positions and the third rotation matrix and the third translation matrix calculated using the images of a combination different from the images of the arbitrary combination and determines a position of the baseline length vector having the baseline length and whose direction is determined by the first and third rotation matrices and whose initial point and terminal point are located on directions represented by the first and third translation matrices, respectively. It is preferred that the three-dimensional data calculator calculates the three-dimensional data based on the positions of the initial and terminal points located on the directions represented by the first and third translation matrices, respectively.

It is preferred that the three-dimensional measurement apparatus further comprises an image capture position detector for detecting location information of the first image capture position and the second image capture position. The epipolar line calculator determines an initial value of the first virtual translation distance or a range within which the first virtual translation distance varies, based on a distance between the first and second image capture positions calculated from the location information detected by the image capture position detector.

It is preferred that the epipolar line calculator determines an initial value of the first virtual translation distance or a range within which the first virtual translation distance varies, based on an expression $|BL| \times \epsilon / \gamma$ where $|BL|$ denotes the baseline length, s denotes parallax between the image taken from the first image capture position and the image taken from the second image capture position, and $\gamma$ denotes parallax between the two images taken from the first image capture position.

It is preferred that the three-dimensional data is one of a distance between two points on the object, an angle between two points on the object, and three-dimensional model data of the object.

The image processing device according to the present invention comprises a storage, a feature point detector, a corresponding point detector, a rotation matrix calculator, a translation matrix calculator, an epipolar line calculator, an evaluator, and three-dimensional data calculator. The storage stores images of an object taken from first and second image capture positions with one or two stereo cameras. The stereo camera has a first imaging unit for imaging the object and a second imaging unit disposed at a distance of a predetermined baseline length from the first imaging unit. The second imaging unit images at least a part of the object imaged with the first imaging unit. The feature point detector detects a plurality of feature points in at least one of the two images of the object taken from the first image capture position with the first and second imaging units. The corresponding point detector detects corresponding points in at least one of the two images of the object taken from the second image capture position with the first and second imaging units. The second image capture position is different from the first image capture position. The corresponding points correspond to the feature points. The rotation matrix calculator calculates a rotation matrix representing angle and direction of rotation of the first or second imaging unit at the second image capture position relative to the first or second imaging unit at the first image capture position. The translation matrix calculator calculates a translation matrix representing a translation direction of the first or second imaging unit at the second image capture position relative to the first or second imaging unit at the first image capture position. The epipolar line calculator calculates an epipolar line based on a relative positional relationship between each of the imaging units at the first and second image capture positions. The relative positional relationship is determined based on a first rotation matrix, a first translation matrix, and a first virtual translation distance. The first rotation matrix is calculated by the rotation matrix calculator based on the feature points and the corresponding points. The first translation matrix is calculated by the translation matrix calculator based on the feature points and the corresponding points. The first virtual translation distance is an arbitrarily assumed distance between the imaging unit taking the image in which the feature points are detected and the imaging unit taking the image in which the corresponding points are detected. The epipolar line is a projection of a direction of line of sight from the imaging unit at the first image capture position to the specific feature point onto the image taken from the second image capture position. The evaluator evaluates whether each of the epipolar lines passes through the corresponding point corresponding to the feature point. The epipolar lines are calculated with the different first virtual translation distances. The three-dimensional data calculator calculates three-dimensional data of the object with the use of the first virtual translation distance assumed for calculating the epipolar line passing through the specific feature point.

A three-dimensional measurement method according to the present invention comprises a feature point detection step, a corresponding point detection step, a rotation matrix calculation step, a translation matrix calculation step, an epipolar line calculation step, an evaluation step, and three-dimensional data calculation step. In the feature point detection step, a plurality of feature points are detected in at least one of two images of an object taken from a first image capture position with one or two stereo cameras. The stereo camera has a first imaging unit for imaging the object and a second imaging unit disposed at a distance of a predetermined baseline length from the first imaging unit. The second imaging unit images at least a part of the object imaged with the first imaging unit. In corresponding point detection step, corresponding points that correspond to the feature points are detected in at least one of two images of the object taken from a second image capture position with the first and second imaging units. The second image capture position is different from the first image capture position. In a rotation matrix calculation step, a rotation matrix representing angle and direction of rotation of the first or second imaging unit at the second image capture position is calculated relative to the first or second imaging unit at the first image capture position. In the translation matrix calculation step, a translation matrix representing a translation direction of the first or second imaging unit at the second image capture position is calculated relative to the first or second imaging unit at the first image capture position. In the epipolar line calculation step, an epipolar line is calculated based on a relative positional relationship between each of the imaging units at the first and second image capture positions. The relative positional relationship is determined based on a first rotation matrix, a first translation matrix, and a first virtual translation distance. The first rotation matrix is calculated by the rotation matrix calculator based on the feature points and the corresponding points. The first translation matrix is calculated by the translation matrix calculator based on the feature points and the corresponding points. The first virtual translation distance is an arbitrarily assumed distance between each of the imaging unit taking the image in which the feature points are detected and the imaging unit taking the image in which the corresponding points are detected. The epipolar line is a projection of a direction of line of sight from the imaging unit at the first image capture position to the specific feature point onto the image taken from the second image capture position. In the evaluation step, whether each of the epipolar lines passes through the corresponding point corresponding to the feature point is evaluated. The epipolar lines are calculated with the different first virtual translation distances. In the three-dimensional data calculation step, three-dimensional data of the object is calculated with the use of the first virtual translation distance assumed for calculating the epipolar line passing through the specific feature point.

According to the present invention, two imaging units with the predetermined baseline length are used to take the images from the two image capture positions. A distance (which corresponds to the baseline length of a huge stereo camera) between the imaging units is calculated based on the taken images. Thereby the three-dimensional measurement is performed with high accuracy without calibration or a reference object, but only with the use of the images of the object whose three-dimensional data is to be measured.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

First Embodiment

Figure 1:
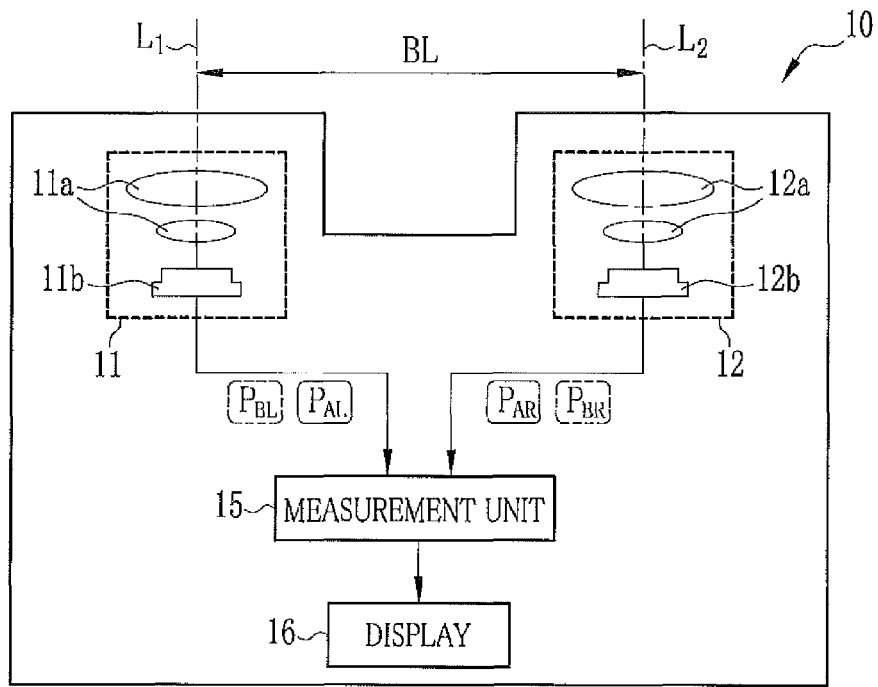
FIG. 1 is an explanatory view of a three-dimensional measurement apparatus.

As illustrated in FIG. 1, a three-dimensional measurement apparatus 10 comprises a first imaging unit 11, a second imaging unit 12, a measurement unit 15, and a display 16. In other words, the three-dimensional measurement apparatus 10 comprises the so-called stereo camera with the measurement unit 15, to calculate three-dimensional data of an object from taken images. The three-dimensional measurement apparatus 10 is compact in size (the order of the size of a simple conventional stereo camera) and carried easily.

The first imaging unit 11 and the second imaging unit 12 are disposed side by side in a left-right direction of the three-dimensional measurement apparatus 10. Imaging optical axes $L_1$ and $L_2$ are parallel. A baseline length BL is determined accurately at the manufacture of the three-dimensional measurement apparatus 10, and is a known value in the three-dimensional measurement using the images taken by the first and second imaging units 11 and 12. Note that the baseline length BL is a distance between the first imaging unit 11 and the second imaging unit 12, and more specifically, a distance between the imaging optical axes $L_1$ and $L_2$. In a case where the imaging optical axes $L_1$ and $L_2$ are not parallel, the baseline length BL is a distance between principal points of the imaging units 11 and 12, for example.

Imaging fields of the first imaging unit 11 and the second imaging unit 12 are at least partly overlapped with each other. The first imaging unit 11 and the second imaging unit 12 simultaneously capture images of the same object located in the overlapping imaging fields and output a pair of images with parallax in the left-right direction. Note that "the object" in this specification refers to an object or target whose three-dimensional data is to be measured. Hereinafter, the object whose three-dimensional data is to be calculated is contained in each of the images taken with the first imaging unit 11 and the second imaging unit 12. However, three-dimensional data of an object in only one of the images (that is, the image taken with the first imaging unit 11 or the second imaging unit 12) may be calculated based on a structure (a building or the like) located in the overlapping imaging fields.

The first imaging unit 11 comprises a taking lens 11a, an image sensor 11b, and the like. The taking lens 11a forms an image of the object on the image sensor 11b. The taking lens 11a comprises an aperture stop, a movable lens, and a cam, a gear, and the like to make the aperture stop and the movable lens work (all not shown). The taking lens 11a is capable of AF (autofocusing) and magnification. The image sensor 11b is, for example, a CMOS or a CCD and photoelectrically converts the image of the object, which is formed on the imaging surface by the taking lens 11a, on a pixel-by-pixel basis. Thereby the image sensor 11b outputs the image of the object to the measurement unit 15.

The second imaging unit 12 comprises a taking lens 12a, an image sensor 12b, and the like. The taking lens 12a is the same as the taking lens 11a of the first imaging unit 11, and the image sensor 12b is the same as the image sensor 11b of the first imaging unit 11, by way of example. However, the sections (or parts) of the first imaging unit 11 may not necessarily be precisely the same as those of the second imaging unit 12, and may differ from each other. The second imaging unit 12 outputs the taken image to the measurement unit 15 in a manner similar to the first imaging unit 11.

Note that the operations of the first imaging unit 11 and the second imaging unit 12 are controlled by a CPU (not shown) and the like in accordance with a predetermined program. The three-dimensional measurement apparatus 10 comprises an image processing circuit, a memory, an A/D conversion circuit, and the like (not shown). The images outputted from the first and second imaging units 11 and 12 are inputted to the measurement unit 15 after being subjected to various types of image processing such as A/D conversion, white balance correction, and gamma correction.

The measurement unit 15 calculates the three-dimensional data of the object based on four types of images taken from at least two different image capture positions with the first and second imaging units 11 and 12. The three-dimensional data calculated by the measurement unit 15 includes dimensions in real space such as a distance (length, height, or width) between two points, a length of a curve, curvature, area, volume, and positional coordinates, and three-dimensional model data in virtual space in which the object is represented by wire frames or a polygon. The measurement unit 15 calculates at least one of the above-described data as the three-dimensional data, in accordance with given settings. The measurement unit 15 displays the calculated three-dimensional data on the display 16 in accordance with the settings. For example, the measurement unit 15 displays the taken image on the display 16, with the dimensions or the like of the object in the real space superimposed thereon. The measurement unit 15 associates the taken image with the calculated three-dimensional data, and stores them in a recording device (not shown) such as a memory or a detachable media card. The calculated three-dimensional data is displayed on the display 16 as necessary. The three-dimensional data may not be displayed on the display 16 in a case where the calculated three-dimensional data is stored in a usable form in another device (a computer or the like).

To calculate the three-dimensional data, note that the measurement unit 15 needs images of the object taken from at least two different image capture positions. Hereinafter, the images of the object are taken from two image capture positions (first image capture position A and second image capture position B), and thereby four types of images $P_{AL}$, $P_{AR}$, $P_{BL}$, and $P_{BR}$ are obtained. A first subscript (A or B) next to the letter "P" of the images $P_{AL}$, $P_{AR}$, $P_{BL}$, or $P_{BR}$ denotes the image capture position. A second subscript (L or R) next to the first subscript denotes the imaging unit which took the image. The second subscript "L" denotes that the image was taken by the first imaging unit 11. The second subscript "R" denotes that the image was taken by the second imaging unit 12. For example, the image $P_{AL}$ is taken from the first image capture position A with the first imaging unit 11. The image $P_{AR}$ is taken from the first image capture position A with the second imaging unit 12. The image $P_{BL}$ is taken from the second image capture position B with the first imaging unit 11. The image $P_{BR}$ is taken from the second image capture position B with the second imaging unit 12. The measurement unit 15 uses at least three of the four types of images $P_{AL}$, $P_{AR}$, $P_{BL}$, and $P_{BR}$ to calculate the three-dimensional data of the object.

Figure 2:
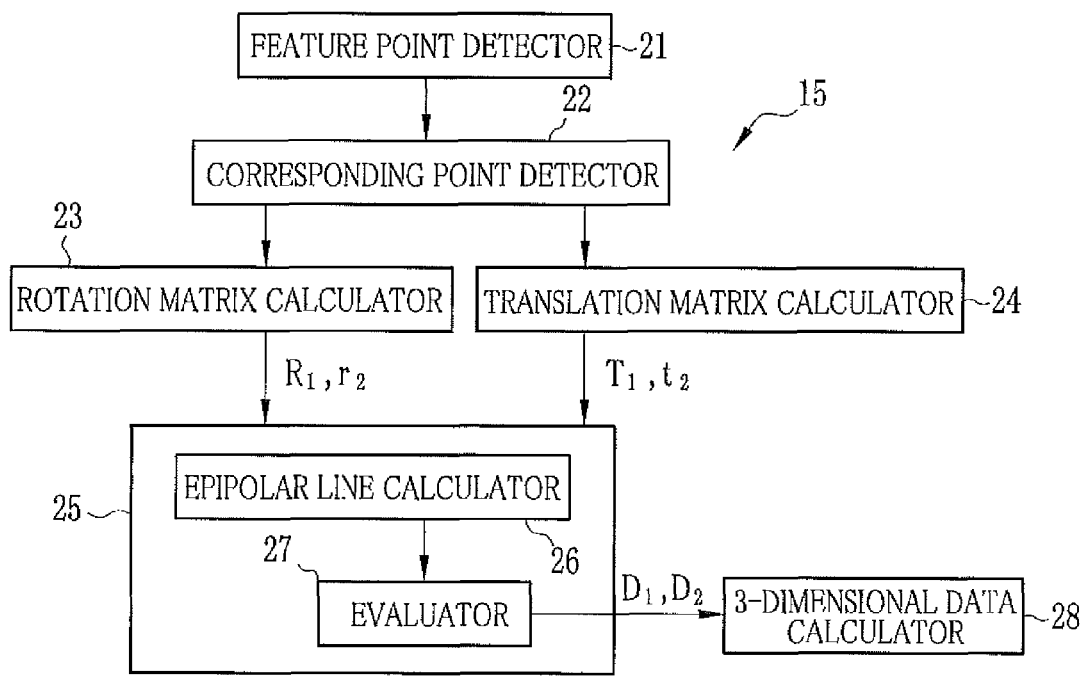
FIG. 2 is a block diagram of a measurement unit.

As illustrated in FIG. 2, the measurement unit 15 comprises a feature point detector 21, a corresponding point detector 22, a rotation matrix calculator 23, a translation matrix calculator 24, a translation distance calculator 25, and a three-dimensional data calculator 28.

The feature point detector 21 detects a plurality of feature points in the inputted image, and inputs information of the feature points such as coordinates of the feature points to the corresponding point detector 22, the rotation matrix calculator 23, and/or the translation matrix calculator 24. The feature point is, for example, a corner of the object, or an end point, an intersection, or a branch point of the lines of the object. The type of the feature point, which is detected by the feature point detector 21, is selected or determined arbitrarily. An algorithm used for a feature point detection process, which is performed by the feature point detector 21, is also determined arbitrarily. For example, Moravec algorithm or Harris algorithm may be used in a case where corners of the object are detected as the feature points.

Note that at least eight feature points are necessary for calculating the three-dimensional data. The type of the feature points is so selected as to detect at least eight feature points. In a case where the number of the detected feature points is less than eight, the feature point detector 21 changes the type of the feature points to be detected or the algorithm for detecting the feature points to ensure detecting at least eight feature points. In case the feature point detector 21 cannot detect eight feature points even after changing the type of the feature points or the algorithm for detection, the feature point detector 21 notifies a user of an error and prompts for changing the object or taking image(s) of the object again.

Although the number of the detected feature points varies depending on the shape of the object or the like, the feature point detector 21 detects the plurality of feature points (more than eight feature points) in most cases. The feature point detector 21 then selects eight to over a dozen or so feature points from the plurality of feature points detected. The feature points selected by the feature point detector 21 may be of any number greater than or equal to eight in the case where the plurality of feature points are detected. Instead of using the selected feature points, all of the detected feature points may be used. In this case, however, it takes quite a long time to detect corresponding points, which will be described below. Therefore it is preferred to select the feature points with the number within a range in which the accuracy is ensured, for example, from eight to a little over a dozen as described above.

After receiving information of the feature points from the feature point detector 21, the corresponding point detector 22 detects the corresponding points, which correspond to the respective feature points, in the image different from the one in which the feature points are detected. An algorithm used for a corresponding point detection process, which is performed by the corresponding point detector 22, is selected or determined arbitrarily. For example, a block matching method or a KLT feature tracker may be used. In a case where the block matching method is used to detect the corresponding points, a partial image with a predetermined size is cut out from the image in which the feature points are detected. While being scaled up (or down) or rotated, the partial image is compared with the image in which the corresponding points are to be detected. Points with high coincidence (or similarity) with the feature points are detected as the corresponding points. The information of the corresponding points, such as the coordinates of the corresponding points detected by the corresponding point detector 22, is inputted to the rotation matrix calculator 23 and the translation matrix calculator 24. In this embodiment, note that the feature points are detected in the image $P_{AL}$ and the corresponding points are detected in the image $P_{BL}$ by way of example.

The rotation matrix calculator 23 calculates a rotation matrix based on the image in which the feature points were detected, the information of the detected feature points, the image in which the corresponding points were detected, and the information of the detected corresponding points. The rotation matrix represents the direction and the amount of the rotation of the imaging unit which took the image in which the corresponding points were detected, relative to the position of the imaging unit which took the image in which the feature points were detected.

Figure 3:
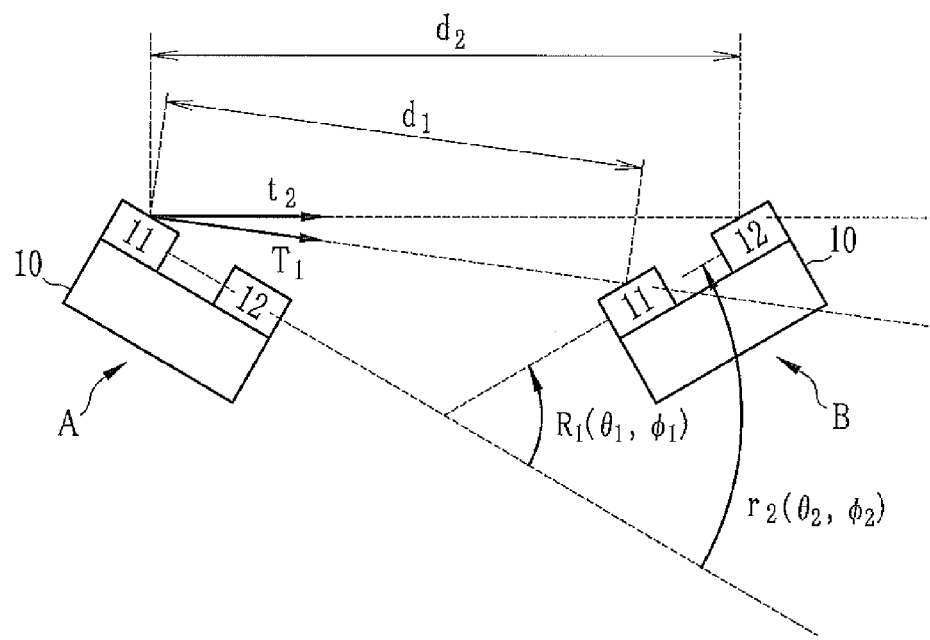
FIG. 3 is an explanatory view illustrating rotation matrices, translation matrices, and translation distances.

For example, as illustrated in FIG. 3, the rotation matrix calculator 23 calculates a rotation matrix $R_1$ based on the feature points in the image $P_{AL}$ and the corresponding points in the image $P_{BL}$. The rotation matrix $R_1$ represents the direction and the amount of the rotation of the first imaging unit 11 at the second image capture position B, relative to the first imaging unit 11 at the first image capture position A.

The rotation matrix $R_1$ is represented by using two parameters, for example, a rotation angle $\theta_1$ in a horizontal plane and a rotation angle $\phi_1$ with respect to a vertical direction. In a case where X, Y, and Z axes, which are orthogonal to each other, are defined in the real space, the rotation matrix $R_1$ may be represented by rotation angles $\alpha$, $\beta$, and $\gamma$ relative to the respective X, Y, and Z axes. The rotation matrix $R_1$ represented by the rotation angles $\theta_1$ and $\phi_1$ is substantially the same as the rotation matrix $R_1$ represented by the rotation angles $\alpha$, $\beta$, and $\gamma$.

After calculating the rotation matrix $R_1$ and a translation matrix $T_1$ (which will be described below), the measurement unit 15 assumes a distance $d_1$ (hereinafter referred to as the virtual translation distance $d_1$) between the first imaging unit 11 at the first image capture position A and the first imaging unit 11 at the second image capture position B. The virtual translation distance $d_1$ is an arbitrary value. Based on the virtual translation distance $d_1$, a relative positional relationship between the imaging units 11 and 12 at the first image capture position A and the imaging units 11 and 12 at the second image capture position B is determined uniquely based on the rotation matrix $R_1$ and the translation matrix $T_1$. The rotation matrix calculator 23 calculates the rotation matrix $r_2$ with the use of the virtual translation distance $d_1$, the rotation matrix $R_1$ and the translation matrix $T_1$. The rotation matrix $r_2$ represents direction and angle of rotation of the second imaging unit 12 at the second image capture position B relative to the first imaging unit 11 at the first image capture position A.

Note that FIG. 3 is illustrated two-dimensionally, so that the rotation matrices $R_1$ and $r_2$ may seem to represent the same rotation. However, the rotation matrix $R_1$ differs from the rotation matrix $r_2$ in a case where the three-dimensional measurement apparatus 10 is rotated in the horizontal and the vertical directions. In this case, the rotation matrix $r_2$ is denoted by the rotation angles $\theta_2$ and $\phi_2$ which differ from those of the rotation matrix $R_1$. In a case where the three-dimensional measurement apparatus 10 is rotated only in the horizontal direction, the rotation matrix $R_1$ is the same as the rotation matrix $r_2$. The rotation matrices $R_1$ and $r_2$, which are calculated by the rotation matrix calculator 23, are inputted to the translation distance calculator 25.

Note that a specific method for calculating a rotation matrix based on the image in which the feature points were detected, the information of the detected feature points, the image in which the corresponding points were detected, and the information of the detected corresponding points is disclosed in Japanese Patent Laid-Open Publication No. 9-237341, for example.

The translation matrix calculator 24 calculates a translation matrix based on the image in which the feature points were detected, the information of the detected feature points, the image in which the corresponding points were detected, and the information of the detected corresponding points. The translation matrix represents the direction (translation direction) of the translation (displacement or change in position) of the imaging unit which took the image in which the corresponding points were detected, relative to the position of the imaging unit which took the image in which the feature points were detected.

To be more specific, the translation matrix calculator 24 calculates the translation matrix $T_1$ (see FIG. 3) based on the feature points in the image $P_{AL}$ and the corresponding points in the image $P_{BL}$. The translation matrix $T_1$ represents the translation direction (direction of the displacement or change in position) of the first imaging unit 11 at the second image capture position B relative to the first imaging unit 11 at the first image capture position A. However, only a normalized value of the translation matrix $T_1$ is calculable in this example, so that information of a translation distance is not included.

As described above, the measurement unit 15 calculates the rotation matrix $R_1$ and a translation matrix $T_1$, and then assumes the virtual translation distance $d_1$ between the first imaging unit 11 at the first image capture position A and the first imaging unit 11 at the second image capture position B. Thereby, the measurement unit 15 determines the relative positional relationship between the imaging units 11 and 12 at the first image capture position A and the imaging units 11 and 12 at the second image capture position B. The translation matrix calculator 24 calculates a translation distance $t_2$ with the use of the virtual translation distance $d_1$, the rotation matrix $R_1$ and the translation matrix $T_1$. The translation matrix $t_2$ represents the translation direction (direction of the displacement or change in position) of the second imaging unit 12 at the second image capture position B relative to the first imaging unit 11 at the first image capture position A.

Note that the translation matrix $t_2$ represents a positional relationship between the first and second imaging units 11 and 12. In a strict sense, the translation matrix $t_2$ does not represent the move (or motion) of the first and second imaging units 11 and 12. In this specification, the positional relationship (or change in position) between the imaging unit (the first imaging unit 11 or the second imaging unit 12) at the first image capture position A and the imaging unit (the first imaging unit 11 or the second imaging unit 12) at the second imaging unit B is referred to as "translation". A distance between the imaging units at the first and second image capture positions A and B is referred to as the translation distance. The translation matrix $t_2$ is a normalized value and does not contain the information of the translation distance, as in the case of the translation matrix $T_1$.

The translation matrices $T_{1a}$ and $t_2$, which are calculated by the translation matrix calculator 24, are inputted to the translation distance calculator 25.

A specific method for calculating the translation matrix based on the image in which the feature points were detected, the information of the detected feature points, the image in which the corresponding points were detected, and the information of the detected corresponding points is disclosed in, for example, the Japanese Patent Laid-Open Publication No.

9-237341, as in the case of the method for calculating the rotation matrix. In this specification, the rotation matrix calculator 23 and the translation matrix calculator 24 are provided separately for the sake of explanation. Actually, the rotation matrix and the translation matrix are calculated as a pair substantially at the same time. The rotation matrix calculator 23 and the translation matrix calculator 24 constitute a circuit as a whole, which calculates the rotation matrix and the translation matrix.

Figure 4:
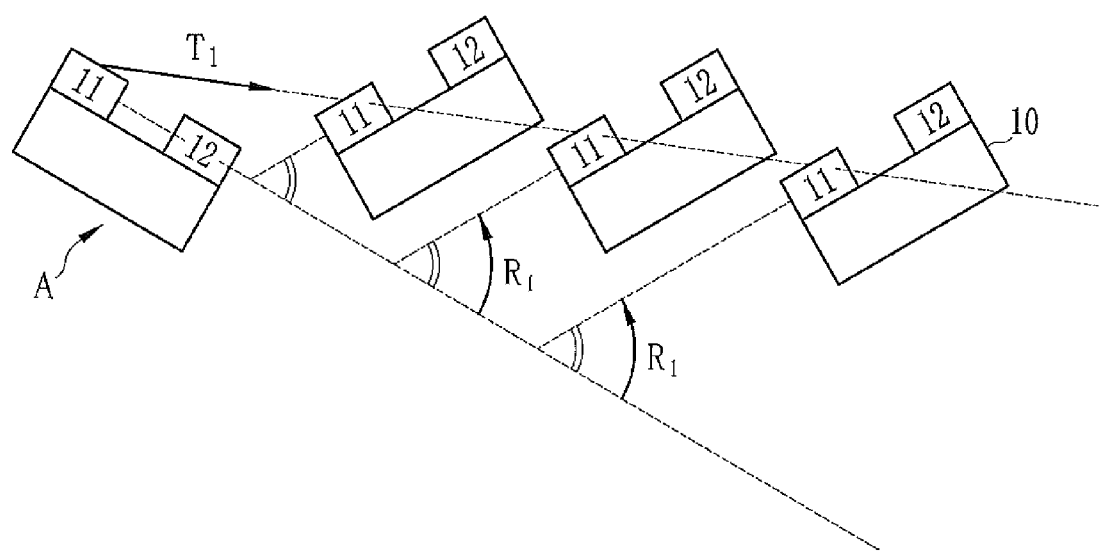
FIG. 4 is an explanatory view illustrating that the translation distance is determined arbitrarily.

As described above, the rotation matrix represents the direction and the amount of the rotation, while the translation matrix represents only the translation direction. The position of the imaging unit at the second image capture position B cannot be determined relative to the imaging unit at the first image capture position A only with the pair of the rotation matrix and the translation matrix ($R_1$ and $T_1$). To be more specific, as illustrated in FIG. 4, the translation matrix $T_1$ determines the translation direction of the first imaging unit 11, and the rotation matrix $R_1$ determines the direction and the amount (angle) of the rotation of the first imaging unit 11 relative to the translation direction. However, arbitrariness of the position of the second image capture position B still remains because the translation distance is not specified. The translation distance calculator 25, which will be described below, of the three-dimensional measurement apparatus 10 calculates a correct translation distance (for example, a correct translation distance $D_1$, which is not a virtual translation distance, between the first imaging unit 11 at the first image capture position A and the first imaging unit 11 at the second image capture position B) with the use of the rotation matrix $R_1$, the translation matrix $T_1$, the virtual rotation matrix $r_2$, and the virtual translation matrix $t_2$. The virtual rotation matrix $r_2$ and the virtual translation matrix $t_2$ are calculated based on the virtual translation distance $d_1$.

The translation distance calculator 25 comprises an epipolar line calculator 26 and an evaluator 27.

The epipolar line calculator 26 calculates a virtual translation distance $d_2$ based on a positional relationship, between the first image capture position A and the second image capture position B, which is determined uniquely from the virtual translation distance $d_1$, the rotation matrix $R_1$, and the translation matrix $T_1$. The virtual translation distance $d_2$ is a distance between the first imaging unit 11 at the first image capture position A and the second imaging unit 12 at the second image capture position B (see FIG. 3). The virtual translation distance $d_2$ is a value calculated based on the virtual translation distance $d_1$ and contains an assumption. For this reason, the virtual translation distance $d_2$ is also referred to as "the virtual translation distance", as with the virtual translation distance $d_1$.

The epipolar line calculator 26 calculates an epipolar line extending in the image taken from the second image capture position B, with the use of the virtual translation distance $d_2$, the rotation matrix $r_2$, and the translation matrix $t_2$. The epipolar line is a straight line, being a projection of a direction of line of sight of the imaging unit at the first image capture position A onto the image taken from the second image capture position. Determining the relative positional relationship between the imaging units 11 and 12 at the first image capture position A and the imaging units 11 and 12 at the second image capture position B is necessary to calculate the epipolar line correctly. The epipolar line calculated by the epipolar line calculator 26 is a virtual epipolar line (hereinafter simply referred to as the epipolar line) which corresponds to the virtual translation distance $d_2$ (or the virtual translation distance because the virtual translation distance $d_2$ is calculated based on the virtual translation distance $d_1$).

To be more specific, in this embodiment, the epipolar line calculator 26 calculates the epipolar line based on the assumed virtual translation distance $d_2$. The epipolar line is a projection of a direction of line of sight passing through a point on the object which corresponds to the feature point detected in the image $P_{AL}$ onto the image $P_{BR}$ taken from the second image capture position B with the second imaging unit 12. The epipolar line calculated by the epipolar line calculator 26 does not pass through the corresponding point on the image $P_{BR}$ in the case where the virtual translation distances $d_1$ and $d_2$ are incorrect. In the case where the virtual translation distances $d_1$ and $d_2$ are equal to the true translation distances, the calculated epipolar line is the true epipolar line and passes through the corresponding point on the image $P_{BR}$.

Note that the epipolar line calculator 26 calculates an epipolar line for at least one feature point even though the epipolar line is calculable for each of the feature points. In this embodiment, the epipolar line calculator 26 calculates the epipolar line for one feature point which is selected arbitrarily. Alternatively, two or more epipolar lines may be calculated for the respective feature points. In the case where the epipolar lines are calculated for the respective feature points, each epipolar line will be evaluated by the evaluator 27, which will be described below.

The three-dimensional measurement apparatus 10 calculates the rotation matrices $r_2$, the translation matrices $t_2$, the virtual translation distances $d_2$, and the epipolar lines for two or more times with varying virtual translation distances $d_1$. Thereby, two or more types of epipolar lines, which differ in the virtual translation distances $d_1$ and $d_2$, are calculated for one feature point.

The evaluator 27 evaluates whether the epipolar lines, which differ in the virtual translation distance $d_1$ and are supposed to pass through the same feature point, actually pass through the corresponding point. The evaluator 27 selects the true epipolar line passing through the point which corresponds to the feature point, and thereby calculates the virtual translation distance which represents the true translation distance. The evaluator 27 performs the evaluation as follows, for example. First, the evaluator 27 cuts out a partial image from the image $P_{AL}$ from which the feature points have been extracted. The partial image contains the feature point through which the epipolar line is supposed to pass. Then, the evaluator 27 calculates the coincidence between the partial image and portions of the image $P_{BR}$, along the epipolar line extending in the image $P_{BR}$. The coincidence is calculated along each epipolar line calculated by the epipolar line calculator 26.

In the case where the virtual translation distance $d_1$ is incorrect, the epipolar line calculated with the use of this incorrect virtual translation distance $d_1$ does not pass through the corresponding point, that is, the point corresponding to the feature point through which the epipolar line is supposed to pass. Therefore the coincidence is low. In the case where the virtual translation distance $d_1$ is correct, the epipolar line calculated with the use of this correct virtual translation distance $d_1$ passes through the corresponding point, so that the coincidence with the partial image becomes high at the corresponding point, as compared with other epipolar lines. The evaluator 27 selects the epipolar line with the highest coincidence with the partial image after evaluating the coincidence along every epipolar line calculated by the epipolar line calculator 26. The evaluator 27 determines the virtual translation distance $d_1$ used for calculating the selected epipolar line to be the true translation distance $D_1$ between the first imaging unit 11 at the first image capture position A and the first imaging unit 11 at the second image capture position B. The true translation distance $D_1$ thus calculated by the evaluator 27 is inputted to the three-dimensional data calculator 28.

After the true translation distance $D_1$ is calculated, note that the correct relative positional relationship between the imaging units 11 and 12 at the first image capture position A and the imaging units 11 and 12 at the second image capture position B is determined based on the rotation matrix $R_1$, the translation matrix $T_1$, and the translation distance $D_1$. The rotation matrix $r_2$, the translation matrix $t_2$, and the virtual translation distance $d_2$, which are calculated with the use of the virtual translation distance $d_1$ (the true translation distance $D_1$) corresponding to the epipolar line selected by the evaluator 27, are the true rotation matrix $R_2$, the true translation matrix $T_2$, and the true translation distance $D_2$, respectively.

The three-dimensional data calculator 28 associates coordinates (u, v) on the image $P_{AL}$ with coordinates (X, Y, Z) in the real space based on a mathematical expression 1 where "w" denotes parallax between the image $P_{AL}$ and the image $P_{BL}$, "f" denotes a focal length for taking the image $P_{AL}$, and "p" denotes a pixel pitch in the image sensor 11b. The parallax is represented by a difference between the coordinate(s) of the pixel which correspond to the feature point and the coordinate(s) of the pixel which correspond to the corresponding point. For example, in a case where the three-dimensional measurement apparatus 10 is rotated only in the horizontal direction from the first image capture position A to the second image capture position B, the parallax is represented by a difference ($w=u_f-u_c$) between the u coordinate ("$u_f$") of the feature point and the u coordinate ("$u_c$") of the corresponding point. Note that the coordinates on the image $P_{BL}$ or the image $P_{BR}$ are converted into the coordinates in the real space by changing or substituting the translation distance $D_1$, the parallax "w", the focal length "f", and the pixel pitch "p" as appropriate in the mathematical expression 1.

$$\begin{bmatrix} X \\ Y \\ Z \end{bmatrix} = \begin{bmatrix} u \times \dfrac{D_1}{w} \\ v \times \dfrac{D_1}{w} \\ \dfrac{f}{p} \times \dfrac{D_1}{w} \end{bmatrix}$$ (Mathematical expression 1)

The three-dimensional data calculator 28 uses the coordinates in the real space, which is calculated from the coordinates on the image $P_{AL}$, to calculate the three-dimensional data of the object, as described above. In a case where the dimension in the real space, for example, the distance between the feature points is calculated, the dimension calculated by the three-dimensional data calculator 28 is superimposed on the image $P_{AL}$. The image $P_{AL}$ with the dimension superimposed is displayed on the display 16. In a case where the three-dimensional data calculator 28 calculates the three-dimensional model data, the three-dimensional model data is displayed on the display 16.

Note that the detectors and calculators 21 to 28 of the measurement unit 15 are composed of a memory, various processing circuits, a CPU for centrally controlling the operations of the circuits and the like, and a control program. The circuits and the like constituting the detectors and the calculators 21 to 28 may be partly or entirely shared by the detectors and the calculators 21 to 28.

Figure 5:
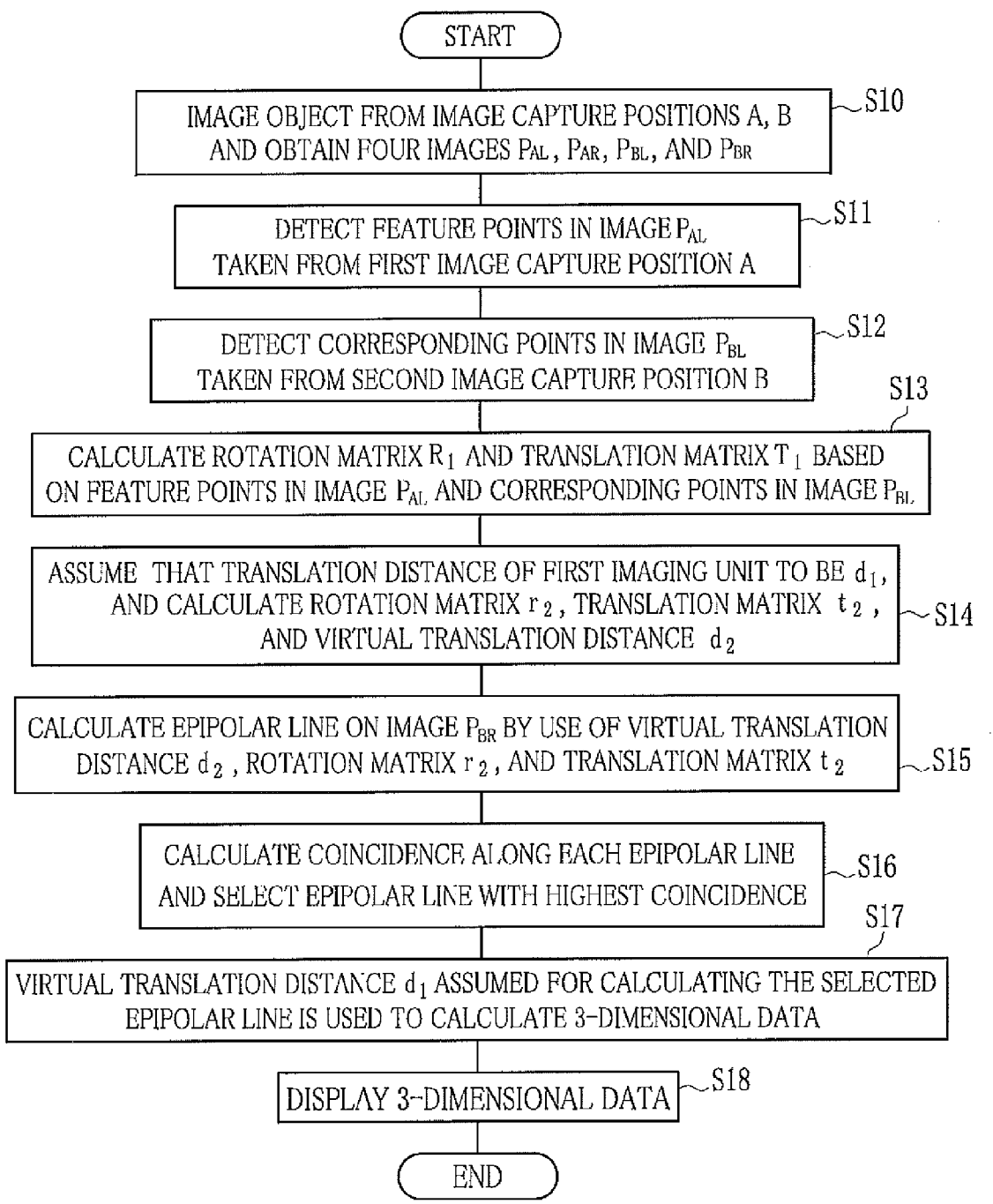
FIG. 5 is a flowchart illustrating a procedure of three-dimensional measurement.

An operation of the above-described three-dimensional measurement apparatus 10 is described. As illustrated in FIG. 5, images of the object whose three-dimensional data is to be measured are taken from the first image capture position A and the second image capture position B with the three-dimensional measurement apparatus 10. Thereby, four images $P_{AL}$, $P_{AR}$, $P_{BL}$, and $P_{BR}$ are taken ("imaging step" denoted as S10). Here, it is preferred that the object is located at the nearest position possible in the overlapping imaging fields of the first and second imaging units 11 and 12. Resolving power of the three-dimensional data, which will be described below, is reduced as the object distance increases. In particular, the resolving power in the depth direction of the image is significantly reduced as the object distance increases. To be more specific, it is preferred that the object to be imaged is located within 1 to 3 m. In this case, the three-dimensional measurement apparatus 10 has the resolving power in the order of 1%, in the depth direction, relative to the object distance.

Figure 6:
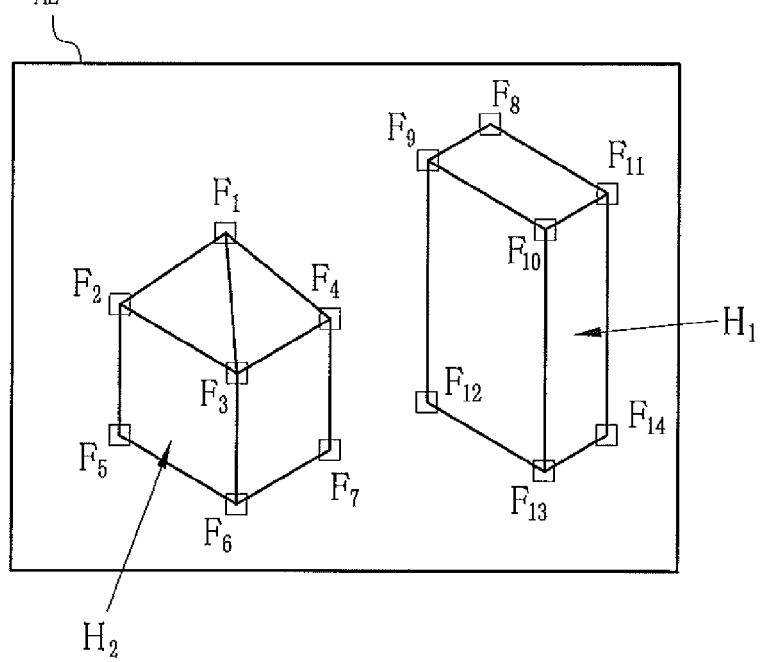
FIG. 6 is an explanatory view schematically illustrating feature points.

After the four images $P_{AL}$, $P_{AR}$, $P_{BL}$, and $P_{BR}$ are obtained, the feature points in the image $P_{AL}$ are detected ("feature point detection step" denoted as S11). For example, as illustrated in FIG. 6, in a case where the objects $H_1$ and $H_2$ are contained in the image $P_{AL}$, the feature point detector 21 detects corners or the like of each of the objects $H_1$ and $H_2$ as feature points $F_1$ to $F_{14}$. Since there are fourteen feature points $F_1$ to $F_{14}$, eight feature points are selected to be used for calculating the three-dimensional data. For example, the feature points $F_1$, $F_3$, $F_4$, $F_8$, $F_9$, $F_{11}$, $F_{13}$, and $F_{14}$ are selected.

Figure 7:
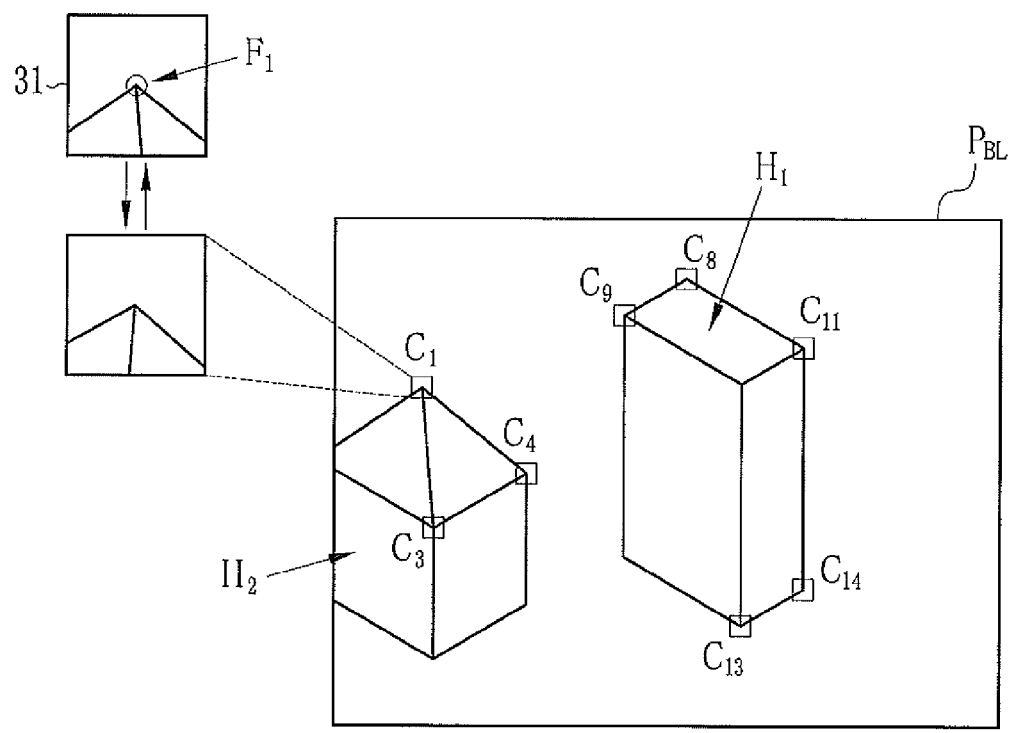
FIG. 7 is an explanatory view schematically illustrating detection of corresponding points.

After the feature points are thus detected and selected, the corresponding point detector 22 detects the corresponding points in the images $P_{BL}$ and $P_{BR}$ ("corresponding point detection step" denoted as S12). To be more specific, as illustrated in FIG. 7, the corresponding point detector 22 cuts out a portion (a partial image 31) from the image $P_{AL}$, in which the feature points have been detected. The partial image 31 contains the feature point $F_1$. The corresponding point detector 22 compares the partial image 31 with portions of the image $P_{BL}$ while the partial image 31 is scaled up (or down) or rotated as necessary. The portion of the image $P_{BL}$ with the highest coincidence with the partial image 31 is detected as the corresponding point $C_1$. In a like manner, the corresponding points $C_3$, $C_4$, $C_8$, $C_9$, $C_{11}$, $C_{13}$, and $C_{14}$ which correspond to the rest of the feature points $F_3$, $F_4$, $F_8$, $F_9$, $F_{11}$, $F_{13}$, and $F_{14}$ are detected, respectively.

Note that the positions and the orientations of the objects $H_1$ and $H_2$ in the image $P_{AL}$ differ from those of the objects $H_1$ and $H_2$ in the image $P_{BL}$ due to the parallax caused by the image capture positions and the imaging orientations or directions. For this reason, there are cases where the corresponding point which corresponds to the selected feature point may not be detected in the image $P_{BL}$. For example, corresponding points corresponding to the feature points $F_2$ and $F_5$ (see FIG. 6) cannot be detected in the image $P_{BL}$ in FIG. 7 because they are not contained in the image $P_{BL}$. Portions with high coincidence with the feature points may be detected as the corresponding points even though the detected portions are unrelated to the feature points. In the cases where the corresponding point cannot be detected or the highest coincidence is less than a predetermined level, the feature points are reselected. Then the corresponding points which correspond to the reselected feature points are redetected.

After the corresponding points are detected, the rotation matrix $R_1$ and the translation matrix $T_1$ are calculated based on the coordinates of the feature points in the image $P_{AL}$ and the coordinates of the corresponding points in the image $P_{BL}$ (S13). "S13" corresponds to the rotation matrix calculation step and the translation matrix calculation step.

After the rotation matrix $R_1$ and the translation matrix $T_1$ are calculated, the measurement unit 15 determines the arbitrary virtual translation distance $d_1$. The rotation matrix calculator 23 and the translation matrix calculator 24 calculate the rotation matrix $r_2$ and the translation matrix $t_2$ with the use of the virtual translation distance $d_1$ (S14). The epipolar line calculator 26 calculates the virtual translation distance $d_2$ based on the virtual translation distance $d_1$, the rotation matrix $R_1$, and the translation matrix $T_1$ (S14). Thus, S14 corresponds to a second rotation matrix calculation step, a second translation matrix calculation step, and the second translation distance calculation step.

Note that S14 is repeated using different virtual translation distances $d_1$. Thereby, two or more combinations of the rotation matrix $r_2$, the translation matrix $t_2$, and the virtual translation distance $d_2$ are calculated based on the different virtual translation distances $d_1$.

After the rotation matrix $r_2$, the translation matrix $t_2$, and the virtual translation distance $d_2$ are thus calculated using the virtual translation distance $d_1$, the epipolar line calculator 26 calculates the epipolar line, which extends in the image $P_{BR}$, with the use of the virtual translation distance $d_2$, the rotation matrix $r_2$, and the translation matrix $t_2$ ("epipolar line calculation step" denoted as S15).

Figure 8:
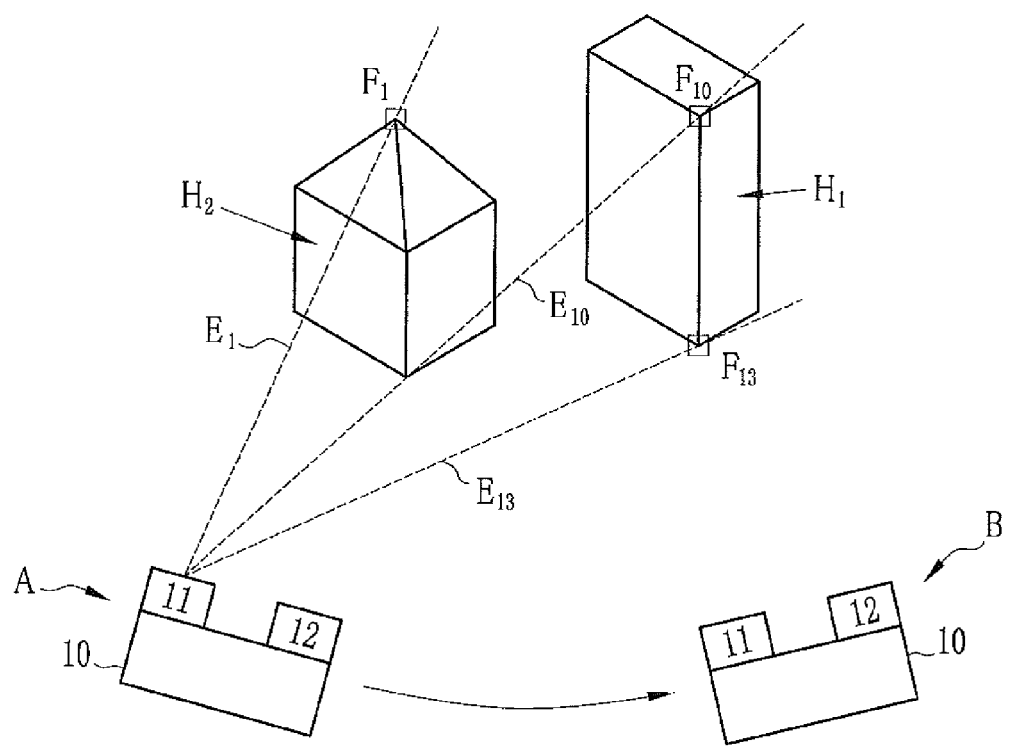
FIG. 8 is an explanatory view illustrating epipolar lines.

As illustrated in FIG. 8, there are straight lines (epipolar lines) extending from the first imaging unit 11 at the first image capture position A to the feature points of the objects $H_1$ and $H_2$. The epipolar line may be calculated for each feature point of the objects $H_1$ and $H_2$. In FIG. 8, the epipolar lines $E_1$, $E_{10}$, and $E_{13}$, which pass through the feature points $F_1$, $F_{10}$, and $F_{13}$, respectively, are illustrated by way of example. The epipolar line for the feature points other than the feature points $F_1$, $F_{10}$, and $F_{13}$ may be calculated. In this embodiment, the epipolar line calculator 26 calculates the epipolar line $E_{10}$ that passes through the feature point $F_{10}$, by way of example. The epipolar line on the image $P_{BR}$ refers to a straight line, being the projection of the epipolar line extending in a space as illustrated in FIG. 8 onto the image $P_{BR}$.

The epipolar line $E_{10}$ is supposed to be passing through the corresponding point $C_{10}$, which corresponds to the feature point $F_{10}$, in the case where the assumed virtual translation distance $d_1$ is correct. However, the virtual translation distance $d_1$ is just an assumed value, which is determined arbitrarily by the translation distance calculator 25. As illustrated in the upper part of FIG. 9, inclinations, starting points, and endpoints of the epipolar lines $E_{10}$ $[d_{1a}]$ to $E_{10}[d_{1d}]$ on the image $P_{BR}$ vary depending on the virtual translation distance $d_1$ in a case where the epipolar lines $E_{10}$ are calculated based on four types of virtual translation distance $d_1$ ($d_{1a}$, $d_{1b}$, $d_{1c}$, and $d_{1d}$), and $E_{10}$ $[d_{1a}]$, $E_{10}$ $[d_{1b}]$, $E_{10}[d_{1c}]$, and $E_{10}$ $[d_{1d}]$ denote the epipolar lines $H_{10}$ which correspond to the virtual translation distances $d_{1a}$, $d_{1b}$, $d_{1c}$, and $d_{1d}$, respectively.

Note that the epipolar lines in this embodiment are calculated using four different virtual translation distances $d_1$ by way of example. Actually, the epipolar lines are calculated based on a plurality of virtual translation distances greater than four. The image $P_{BR}$, in which the epipolar line calculated by the epipolar line calculator 26 extends, is the image taken from the second image capture position B and not the image $P_{BL}$ in which the corresponding points have been detected to calculate the rotation matrix $R_1$ and the translation matrix $T_1$. In a case where the corresponding points have been detected in the image $P_{BR}$ in a different setting, the epipolar lines which extend in the image $P_{BL}$ are calculated.

After the epipolar lines $E_{10}[d_{1a}]$ to $E_{10}$ $[d_{1d}]$ extending in the image $P_{BR}$ are calculated, the evaluator 27 cuts out the partial image, which contains the feature point $F_{10}$, from the image $P_{AL}$ and compares the partial image with portions of the image $P_{BR}$ along each of the epipolar lines $E_{10}$ $[d_{1a}]$ to $E_{10}$ $[d_{1d}]$ and thereby calculates the coincidence, in the manner similar to the detection of the corresponding points ("coincidence calculation step" denoted as S16). The comparison between the partial image and the image $P_{BR}$ and the calculation of the coincidence are performed in the manner similar to the detection of the corresponding points, by way of example.

Figure 9:
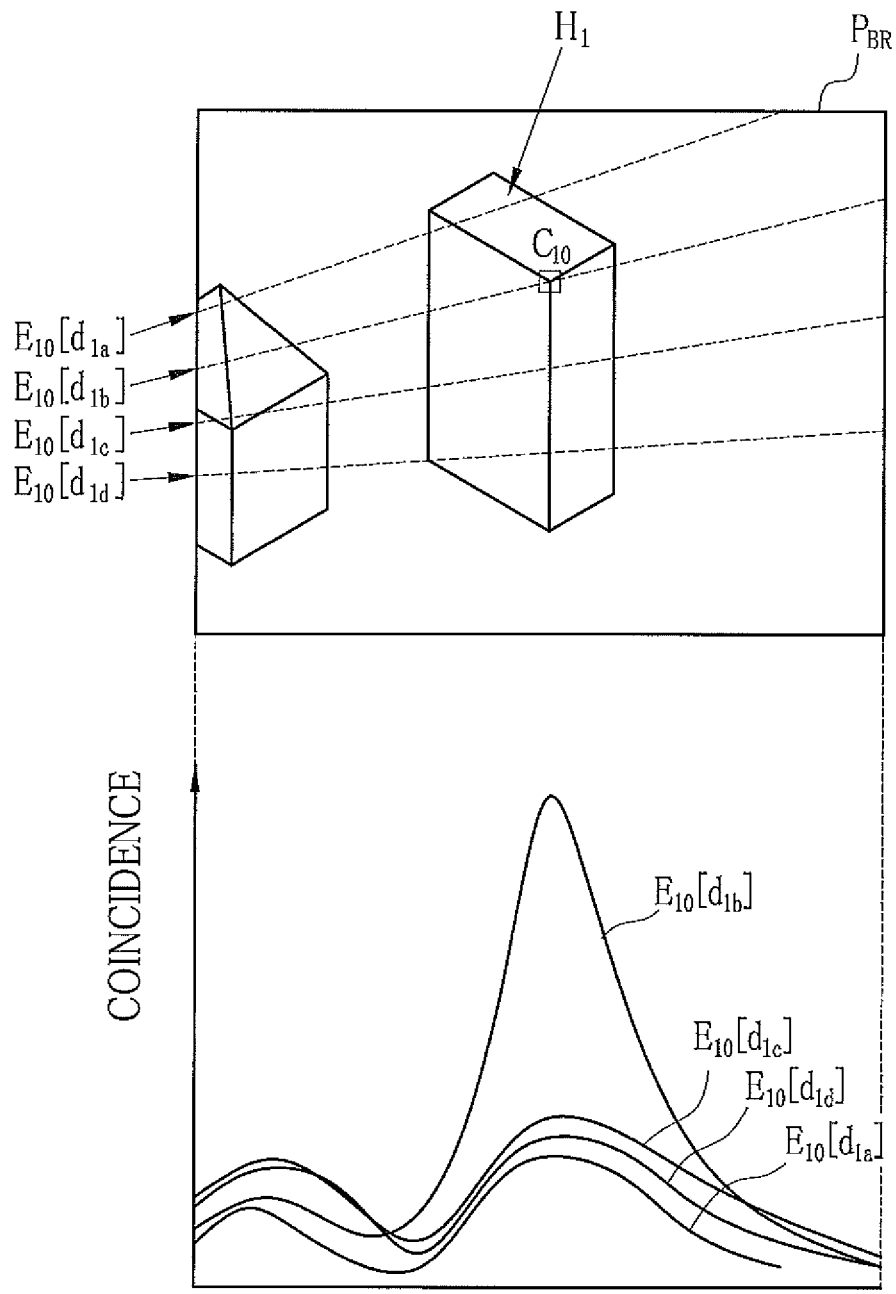
FIG. 9 is an explanatory view illustrating a principle for determining a second image capture position B with the use of the epipolar lines.

As illustrated in the lower part of FIG. 9, in the case where the epipolar line $E_{10}$ does not pass through the corresponding point $C_{10}$, which corresponds to the feature point $F_{10}$, the coincidence calculated by the evaluator 27 may fluctuate but generally remains within a small range. In the case where the epipolar line $E_{10}$ passes through the corresponding point $C_{10}$, the coincidence shows a significant peak in close proximity to the corresponding point $C_{10}$. In FIG. 9, the coincidence along the epipolar lines $E_{10}$ $[d_{1a}]$ $E_{10}[d_{1c}]$ and $E_{10}[d_{1d}]$ is almost constantly low because they do not pass through the corresponding point $C_{10}$. The epipolar line $E_{10}[d_{1b}]$ passes through the corresponding point $C_{10}$, so that the coincidence is high in the close proximity to the corresponding point $C_{10}$, as compared with the epipolar lines other than the epipolar line $E_{10}$ $[d_{1b}]$. The evaluator 27 determines the epipolar line $E_{10}[d_{1b}]$, which includes a peak value of the coincidence, to be the one passing through the corresponding point $C_{10}$, and selects the epipolar line $E_{10}[d_{1b}]$. The evaluator 27 determines the virtual translation distance $d_{1b}$ assumed for calculating the epipolar line $E_{10}$ $[d_{1b}]$ passing through the corresponding point $C_{10}$, to be the true translation distance $D_1$.

Note that the corresponding point $C_{10}$ is depicted in FIG. 9 for the sake of convenience. It is unnecessary to detect the corresponding point $C_{10}$ in the image $P_{BR}$. As described above, selecting the true epipolar line $E_{10}[d_{1b}]$ based on the correspondence is substantially equivalent to selecting the epipolar line passing through the corresponding point $C_{10}$. The coordinates of a point at which the coincidence is at the maximum (peak) on the epipolar line $E_{10}[d_{1b}]$ represent the corresponding point $C_{10}$ in the case the true epipolar line $E_{10}[d_{1b}]$ is selected.

Figure 10:
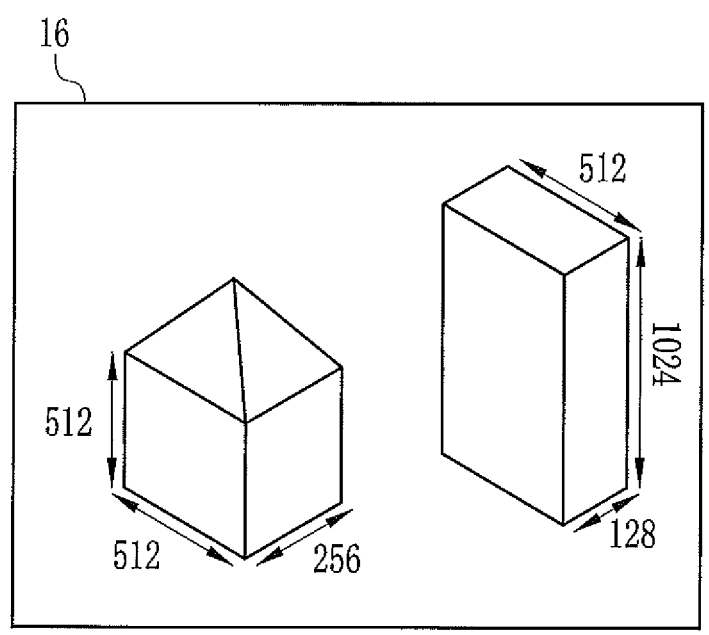
FIG. 10 is an explanatory view illustrating three-dimensional data displayed on a display.
Figure 11:
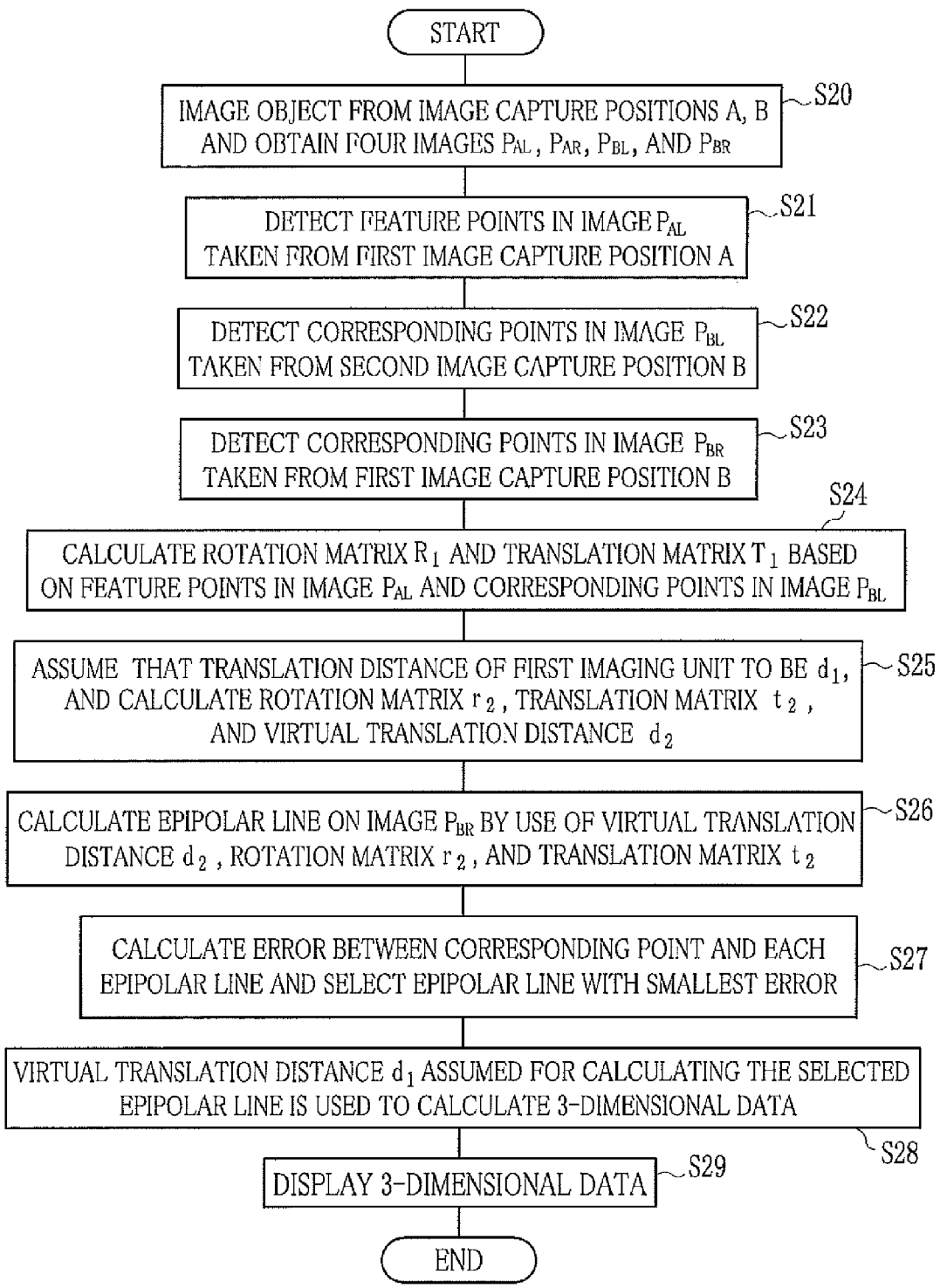
FIG. 11 is a flowchart illustrating a procedure of the three-dimensional measurement according to a second embodiment.

After the translation distance $D_1$ is calculated, the three-dimensional data calculator 28 associates the coordinates in the image $P_{AL}$ with the coordinates in the real space with the use of the mathematical expression 1 and the translation distance $D_1$, the focal length "f" for taking the image $P_{AL}$, the parallax "w", the pixel pitch "p" of the image sensor 11b. Thereby the three-dimensional data of the objects $H_1$ and $H_2$ is calculated ("three-dimensional data calculation step" denoted as S17). The three-dimensional data calculator 28 displays the calculated three-dimensional data on the display 16 ("display step" denoted as S18). For example, as illustrated in FIG. 10, in a case where the distances between the feature points are calculated as the three-dimensional data, the distances between the feature points are superimposed on the image $P_{AL}$. The image with the distances between the feature points superimposed is displayed on the display 16.

As described above, the three-dimensional measurement apparatus 10 comprises the first imaging unit 11 and the second imaging unit 12 with the known baseline length BL, and uses the images $P_{AL}$, $P_{BL}$, and $P_{BR}$ of the object which are taken from two image capture positions. Thereby the three-dimensional measurement apparatus 10 calculates the positional relationship before and after the displacement (or change in position) (in particular, the translation distances $D_1$) and the three-dimensional data. The three-dimensional measurement apparatus 10 eliminates the need for the precise calibration to form a huge stereo camera as described in Japanese Patent Laid-Open Publication Nos. 2007-263669 and 2005-241323. The three-dimensional measurement apparatus 10 also eliminates the need for imaging the reference object simultaneously with the object as described in U.S. Patent Application Publication No. 2011/0249117 (corresponding to Japanese Patent Laid-Open Publication No. 2011-232330). Instead, the three-dimensional data of the object is calculated easily and with high accuracy just by imaging the object with the three-dimensional measurement apparatus 10 while the three-dimensional measurement apparatus 10 is moved or carried.

The three-dimensional measurement apparatus 10 uses the pair of the images $P_{AL}$ and $P_{BL}$ and the pair of the images $P_{AL}$ and $P_{BR}$ to calculate the three-dimensional data. Thereby, the three-dimensional measurement apparatus 10 calculates the rotation matrix and the translation matrix. This means that each of the pair of the first imaging unit 11 at the first image capture position A and the first imaging unit 11 at the second image capture position B and the pair of the first imaging unit 11 at the first image capture position A and the second imaging unit 12 at the second image capture position B is substantially equivalent to forming a huge stereo camera. The baseline length (the translation distance $D_1$ or $D_2$) of each pair is longer than the baseline length BL. For this reason, the three-dimensional measurement apparatus 10 calculates the three-dimensional data with high accuracy.

In the first embodiment, the coincidence values calculated along the epipolar lines are compared with each other and the epipolar line with the highest coincidence (peak value) is selected to be the true epipolar line by way of example. Note that the epipolar line which has the maximum area in the graph of the coincidence may be determined to be the true epipolar line. The epipolar line with the highest median value of coincidence may be selected to be the true epipolar line. The epipolar line with the highest average value of coincidence may be selected to be the true epipolar line. Throughout the specification, the maximum coincidence refers to the area, the median value, the average value, or the height of the peak having the highest value.

Second Embodiment

In the first embodiment, the coincidence with the partial image, which contains the feature point, is calculated along the epipolar line extending in the image $P_{BR}$. Alternatively, the corresponding point may be calculated or located in advance. The true epipolar line may be selected by evaluating an error between the calculated epipolar line and the corresponding point, which will be described below.

First, the object is imaged from the first and second image capture positions A and B and thereby the images $P_{AL}$, $E_{AR}$ $P_{BL}$, and $P_{BR}$ are obtained (S20). The feature points are detected in the image $P_{AL}$ (S21). The corresponding points are detected in the image $P_{BL}$. These steps are the same or similar to S10 to S12 in the first embodiment. Then, in this embodiment, the corresponding points are detected also in the image $P_{BR}$ ("second corresponding point detection step" denoted as S23). The corresponding points detected in the image $P_{BR}$ are used for estimating an error of the epipolar line, which will be described below. Then the rotation matrix $R_1$ and the translation matrix $T_1$ are calculated (S24); the virtual translation distance $d_1$ is assumed and the rotation matrix $r_2$, the translation matrix $t_2$, and the virtual translation distance $d_2$ are calculated (S25); and the epipolar lines extending in the image $P_{BR}$ are calculated (S26) in the manner similar to S13 to S15 in the first embodiment.

After the epipolar lines extending in the image $P_{BR}$ are calculated, the coincidence is calculated and the true epipolar line is selected in the first embodiment. In this embodiment, the error of each epipolar line relative to the corresponding point in the image $P_{BR}$, which is calculated in S23, is evaluated and thereby the true epipolar line is selected. The virtual translation distance $d_1$ assumed for calculating the selected epipolar line (in other words, the virtual translation distance $d_1$ which corresponds to the selected epipolar line) is determined to be the true translation distance $D_1$ (S27).

Figure 12:
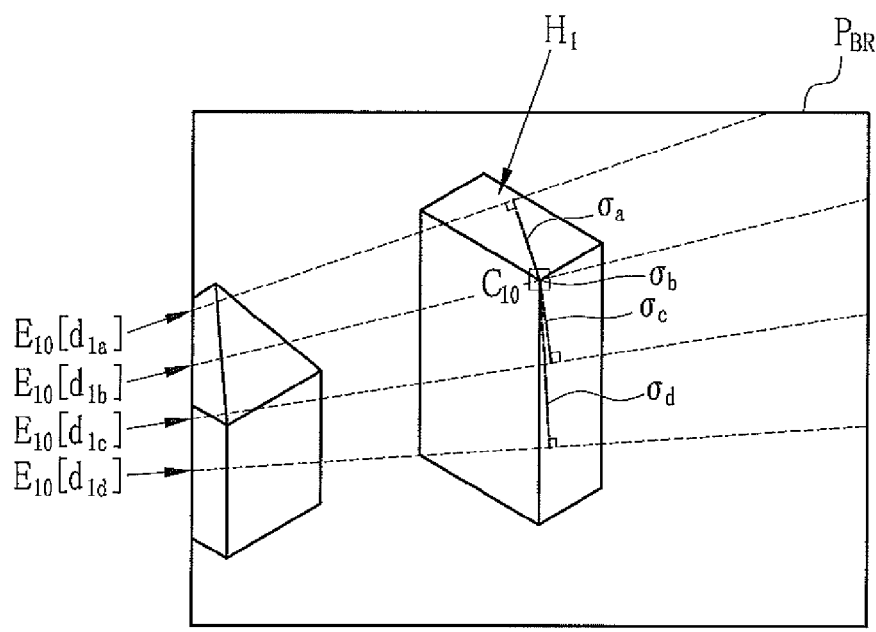
FIG. 12 is an explanatory view illustrating errors between the corresponding point and the epipolar lines.

To be more specific, as illustrated in FIG. 12, given that the epipolar lines $E_{10}[d_{1a}]$ to $E_{10}[d_{1d}]$, which correspond to the four types of the virtual translation distances $d_{1a}$, $d_{1b}$, $d_{1c}$, and $d_{1d}$, are calculated for the feature point $F_{10}$, the evaluator 27 calculates distances $\sigma_a$ to $\sigma_d$ to the corresponding point $C_{10}$, calculated in S23, from the respective epipolar lines $E_H[d_{1a}]$ to $E_H[d_{1d}]$.

One of the epipolar lines $E_{10}[d_{1a}]$ to $E_{10}[d_{1d}]$ calculated for the feature point $F_{10}$ is supposed to be passing through the corresponding point $C_{10}$ in the case where one of the assumed virtual translation distances $d_{1a}$ to $d_{1d}$ is correct. The distances $\sigma_a$ to $\sigma_d$ to the corresponding point $C_{10}$ from the epipolar lines $E_{10}[d_{1a}]$ to $E_{10}[d_{1d}]$ correspond to respective errors of the virtual translation distances $d_a$ to $d_d$ with respect to the true translation distance $D_1$. In FIG. 12, $\sigma_b < \sigma_a \approx \sigma_c < \sigma_d$ and the minimum distance $\sigma_b$ is approximately zero, so that the epipolar line $E_{10}[d_{1b}]$ corresponding to the distance $\sigma_b$ is determined to be the true epipolar line. The evaluator 27 selects the epipolar line $E_{10}[d_m]$ located at the minimum distance from the corresponding point $C_{10}$ to be the true epipolar line. The virtual translation distance $d_{1b}$ assumed for calculating the epipolar line $E_{10}[d_{1b}]$ is determined to be the true translation distance $D_1$.

After the true translation distance $D_1$ is determined, the three-dimensional data is calculated using the translation distance $D_1$ (S28) and displayed (S29) in the same or similar manner to S17 and S18 in the first embodiment.

Selecting the epipolar line with the smallest error $\sigma$ may be faster than calculating the coincidence along the epipolar line and comparing the coincidence as described in the first embodiment, in selecting the true epipolar line. In particular, the time necessary for detecting the corresponding point and selecting the true epipolar line is reduced by selecting the small number of feature points (for example, the feature point $F_{10}$ only) for the evaluation of the error $\sigma$ and detecting the corresponding point which corresponds to the selected feature point (for example, the corresponding point $C_{10}$ in the image $P_{BR}$) as compared with the case where the coincidence is calculated along the epipolar lines for several times, which is equivalent to detecting the corresponding point, as described in the first embodiment.

Third Embodiment

In the first embodiment, the epipolar line on which the coincidence calculated by the evaluator 27 reaches the highest value is determined to be the true epipolar line. However, note that there are cases where the epipolar line with the highest coincidence is not the true epipolar line. In the second embodiment, there are cases where the epipolar line with the smallest error $\sigma$ is not the true epipolar line. These cases (referred to as the failure) are caused by incorrect detection of the corresponding points due to low detection accuracy, or large errors in the rotation matrix $R_1$, the translation matrix $T_1$, and the virtual translation distance $d_2$ due to inappropriate combination of the feature points used, for example. It is preferred to check the presence of the above-described failure to ensure the accuracy in calculating the three-dimensional data. In the case where the failure deteriorates the accuracy in calculating the three-dimensional data, it is preferred to redetect the corresponding points or the like.

Figure 13:
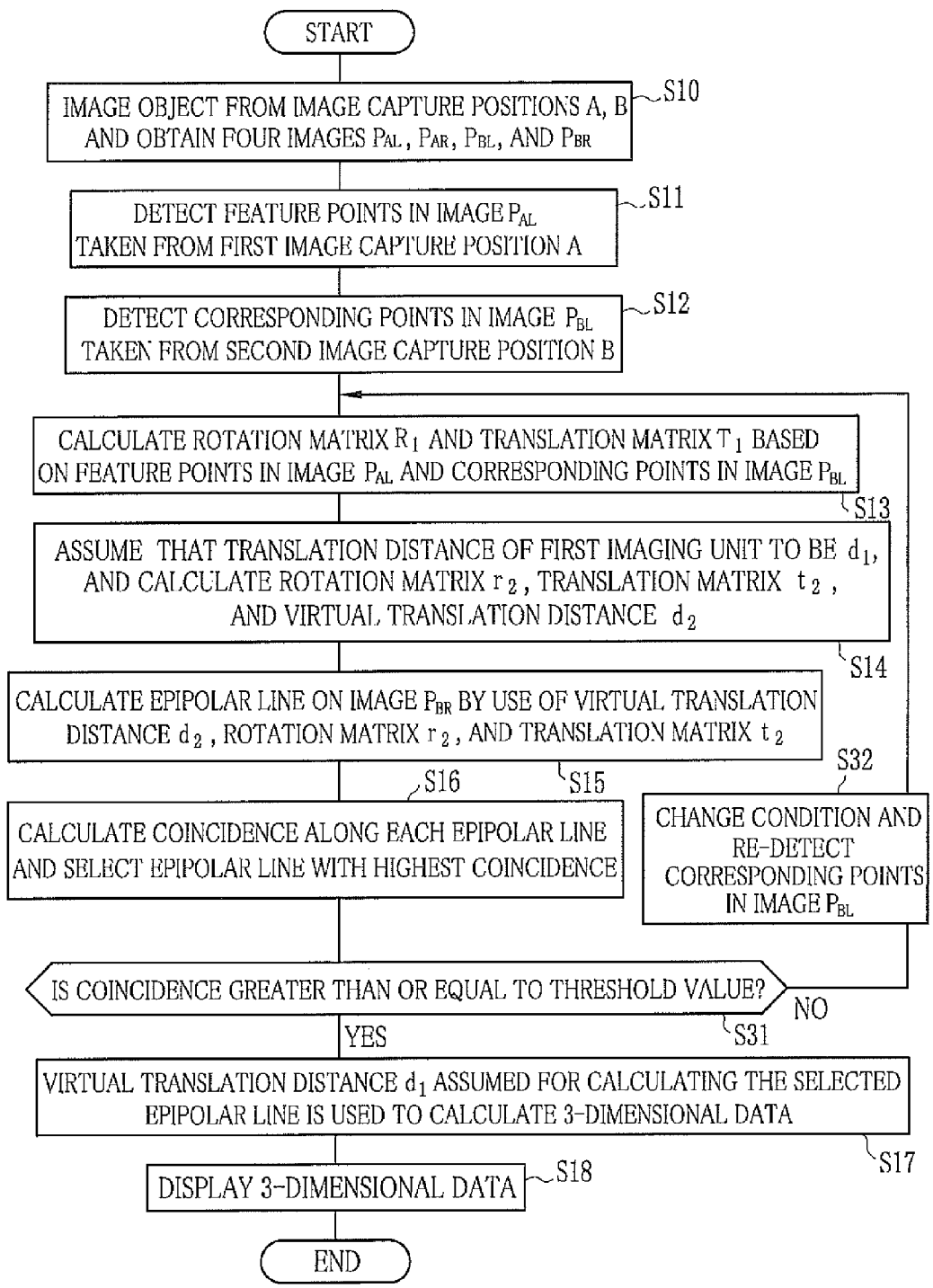
FIG. 13 is a flowchart illustrating a procedure of the three-dimensional measurement according to a third embodiment.

For example, in the case where the true epipolar line is calculated based on the coincidence as described in the first embodiment, whether the selected true epipolar line is correct or not is verified by checking whether the maximum value of the coincidence of the selected true epipolar line is greater than or equal to a predetermined threshold value ("verification step" denoted as S31) after the true epipolar line is selected (S16), as illustrated in FIG. 13. In the case where the maximum value of the coincidence of the selected epipolar line is greater than or equal to the predetermined threshold value, the three-dimensional data is calculated by using the virtual translation distance $d_1$ assumed for calculating the selected epipolar line, as the true translation distance $D_1$ (S17), and displayed (S18).

In the case where the maximum value of the coincidence of the selected epipolar line is less than the predetermined threshold value, there is a possibility that the detected corresponding point does not correspond to the feature point as described above. In this case, the corresponding point is redetected with a changed condition ("corresponding point redetection step" denoted as S32). Based on the redetected corresponding point, the rotation matrices $R_1$ and $r_2$, the translation matrices $T_1$ and $t_2$, and the virtual translation distance $d_2$ are recalculated (S13 and 14); the epipolar line is recalculated (S15); and the coincidence is recalculated (S16).

Note that changing the condition in redetecting the corresponding points may include any one of or any combination of the following: changing the combination of the feature points, changing the size of the partial image 31, changing a magnification ratio or a reduction ratio (a scaling ratio) of the partial image 31, changing the angle of rotation, changing magnification or rotation of the partial image 31 in a case where the corresponding points are detected without magnifying or rotating the partial image 31 to expedite the processing, changing the algorithm for detecting the corresponding points, or the like.

In the example illustrated in FIG. 13, the maximum value of the coincidence (the height of the peak) is compared with the predetermined threshold value. In the case where the true epipolar line is selected based on the area, the median value, the average value, or the like, the value (the area, the median value, the average value, or the like) may be compared with a corresponding predetermined threshold value.

Figure 14:
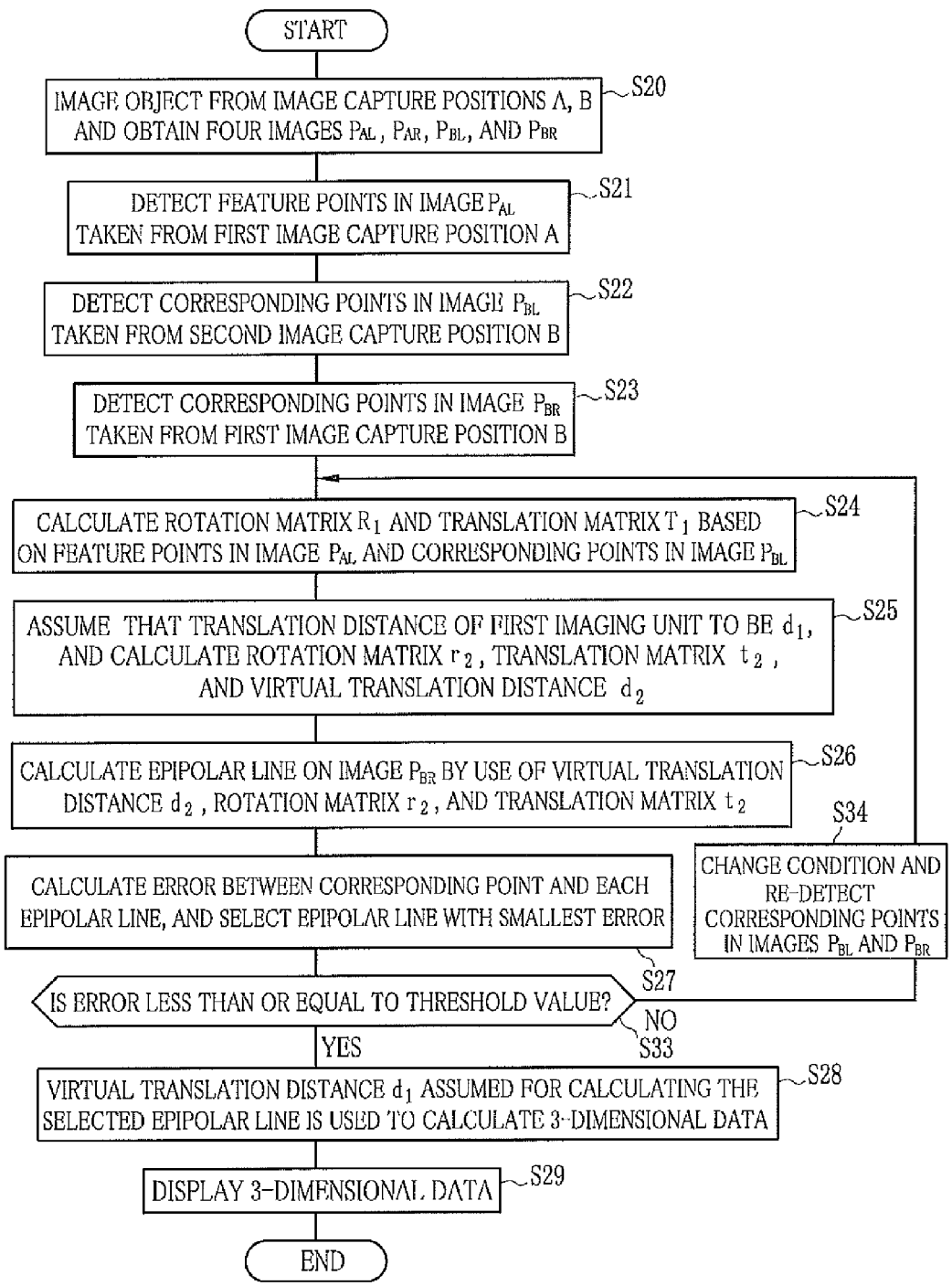
FIG. 14 is a flowchart illustrating a procedure of the three-dimensional measurement in a modified example according to the third embodiment.

Also in the example in the second embodiment, the verification is performed in the manner similar to the above. As illustrated in FIG. 14, after the epipolar line is selected (S27), whether the selected epipolar line is the true epipolar line or not is verified by checking whether the error σ of the epipolar line with respect to the corresponding point is less than or equal to a predetermined threshold value ("verification step" denoted as S33). In the case where the error σ of the selected epipolar line is less than or equal to the predetermined threshold value, the three-dimensional data is calculated by using the virtual translation distance $d_1$ assumed for calculating the selected epipolar line (S17), and displayed (S18).

In the case where the error σ of the selected epipolar line is greater than the predetermined threshold value, there is a possibility that the detected corresponding point does not correspond to the feature point, so that a condition is changed and the corresponding point is redetected ("corresponding point redetection step" denoted as S34). With the use of the redetected corresponding point, the rotation matrices $R_1$ and $r_2$, the translation matrices $T_1$ and $t_2$, and the virtual translation distance $d_2$ are recalculated (S13 and S14); the epipolar line is recalculated (S15); and the coincidence is recalculated (S16). The condition to be changed in S34 is the same as that described above.

Thus, a large error in calculating the three-dimensional data is prevented by redetecting the corresponding point with the changed condition and improving the detection accuracy of the corresponding point.

In the third embodiment, the corresponding points are redetected. Note that the feature points may be redetected or reselected prior to the redetection of the corresponding points. In order to redo the detection of the feature points, a different combination of the feature points may be selected from the previously detected feature points, or the algorithm for detecting the feature points may be changed to redetect the feature points. As described in the third embodiment, the feature points may be redetected in the case where the coincidence remains less than the predetermined threshold value or the error σ remains greater than the predetermined threshold value only by redetecting the corresponding points. Conversely, the feature points may be redetected first. The corresponding points may be redetected in the case where the error σ has not been reduced only by redetecting the feature points.

Fourth Embodiment

Figure 15:
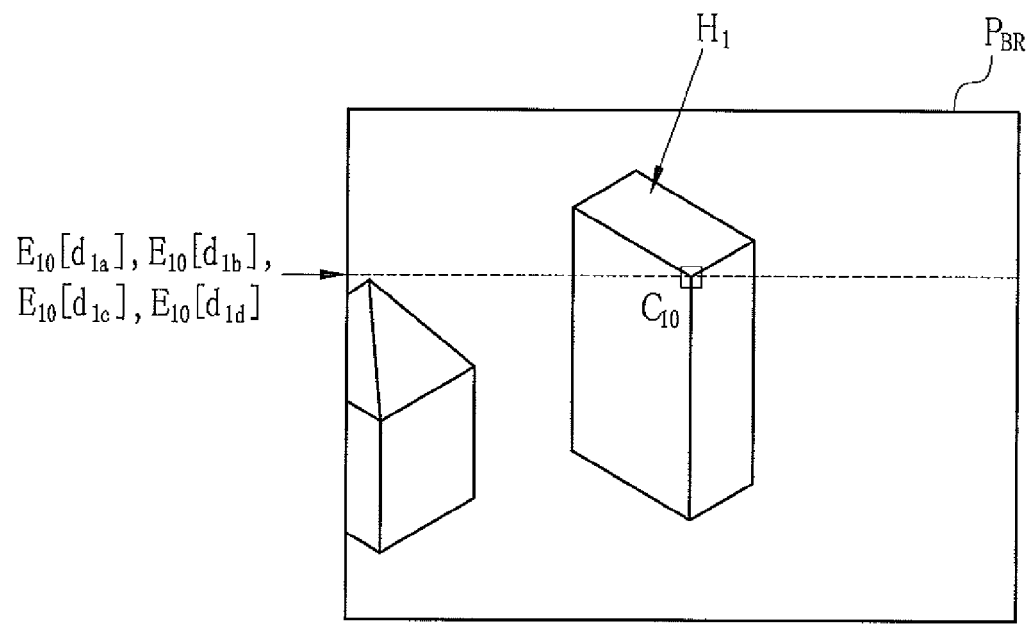
FIG. 15 is an explanatory view illustrating an epipolar line for the three-dimensional measurement apparatus not rotated between the first and second image capture positions.

Note that the first to third embodiments are described on the premise that the different epipolar lines extending in the image $P_{BR}$ are calculated by changing the virtual translation distance $d_1$ as necessary. For example, in a case where the three-dimensional measurement apparatus 10 has not been rotated at all in the vertical direction (φ direction) between the first and second image capture positions A and B, the epipolar line does not change even if the virtual translation distance $d_1$ is changed. To be more specific, as illustrated in FIG. 15, all the epipolar lines $E_{10}[d_{1a}]$ to $E_{10}[d_{1d}]$ are substantially the same and represented by the straight line extending in the horizontal direction. In this case, which one of the virtual translation distances $d_{1a}$ to $d_{1d}$ represents the true translation distance $D_1$ cannot be determined based on the coincidence or error σ. The same holds true for the three-dimensional measurement apparatus 10 moved only translationally without rotation.

Figure 16:
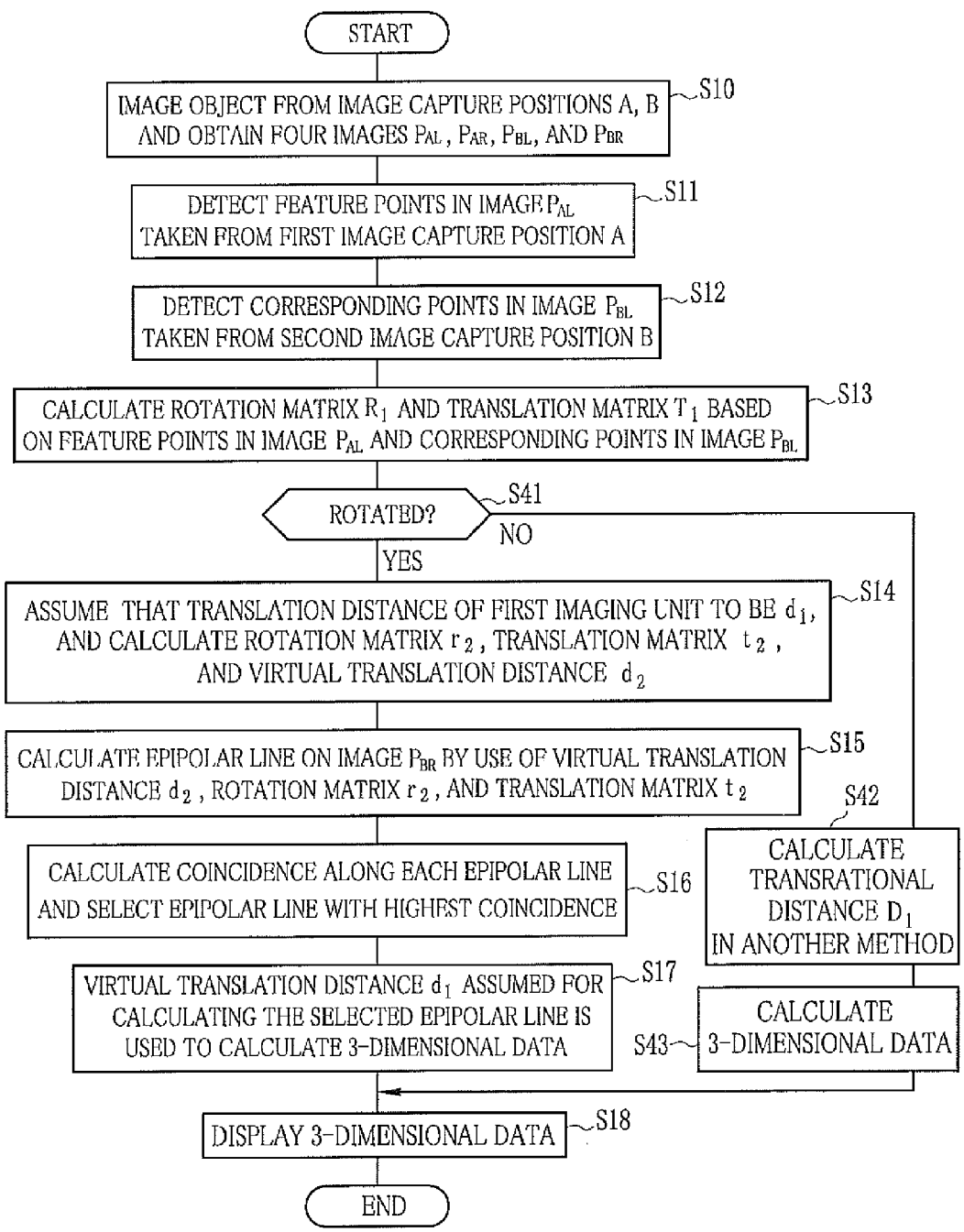
FIG. 16 is a flowchart illustrating a procedure of the three-dimensional measurement according to a fourth embodiment.

To solve this problem, whether the calculated rotation matrix $R_1$ represents the rotation of the three-dimensional measurement apparatus 10 is checked ("rotation checking step" denoted as S41) after the rotation matrix $R_1$ is calculated (S13), as illustrated in FIG. 16. In a case where it is checked that the three-dimensional measurement apparatus 10 is rotated appropriately between the first and second image capture position A and B, the three-dimensional data is calculated in the manner described in the first, second or third embodiment.

In a case where it is checked that the three-dimensional measurement apparatus 10 is not rotated between the first and second image capture positions A and B, the translation distance $D_1$ is calculated in a manner different from those in the first to third embodiments (S42). The three-dimensional data is calculated by using the calculated translation distance $D_1$ (S43).

Figure 17:
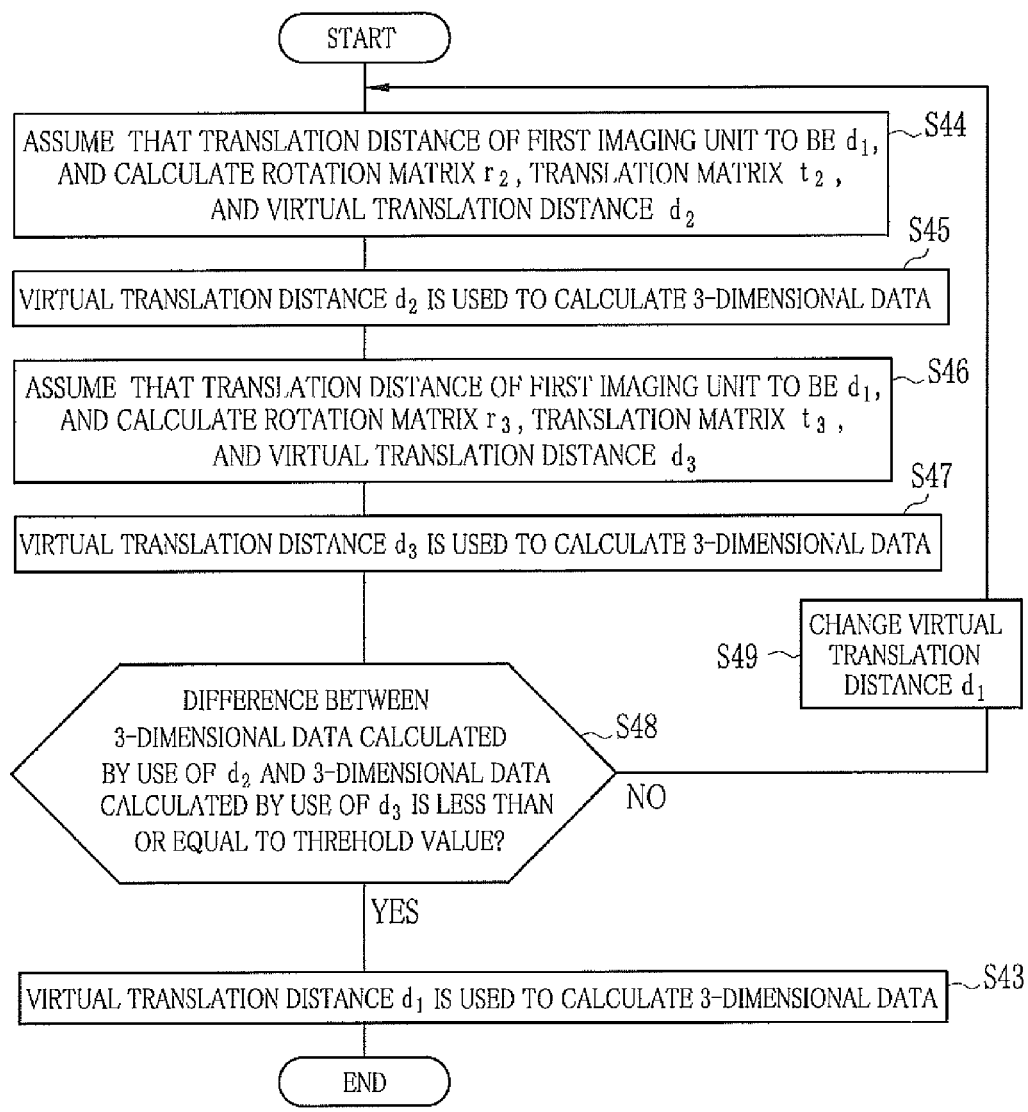
FIG. 17 is a flowchart illustrating an example of S42 and S43.

S42 and S43 are performed as follows, by way of example. As illustrated in FIG. 17, first, the virtual translation distance $d_1$ is assumed, and the rotation matrix $r_2$, the translation matrix $t_2$, and the virtual translation distance $d_2$ are calculated (S44). Here, the rotation matrix $r_2$, the translation matrix $t_2$, and the virtual translation distance $d_2$ calculated are the same as those calculated in S14 in the first embodiment. In the first embodiment, the epipolar lines are calculated by using the rotation matrix $r_2$, the translation matrix $t_2$, and the virtual translation distance $d_2$. In this example, however, the epipolar line does not change even if the virtual translation distance $d_1$ is changed. Instead of calculating the epipolar line, the three three-dimensional data is calculated by using the virtual translation distance $d_2$ (S45). To be more specific, coordinates of a given feature point in the real space is calculated by using the virtual translation distance $d_2$, instead of $D_1$, and the parallax between the image $P_{AL}$ and the image $P_{BL}$ as the parallax "w" in the mathematical expression 1, for example.

Figure 18:
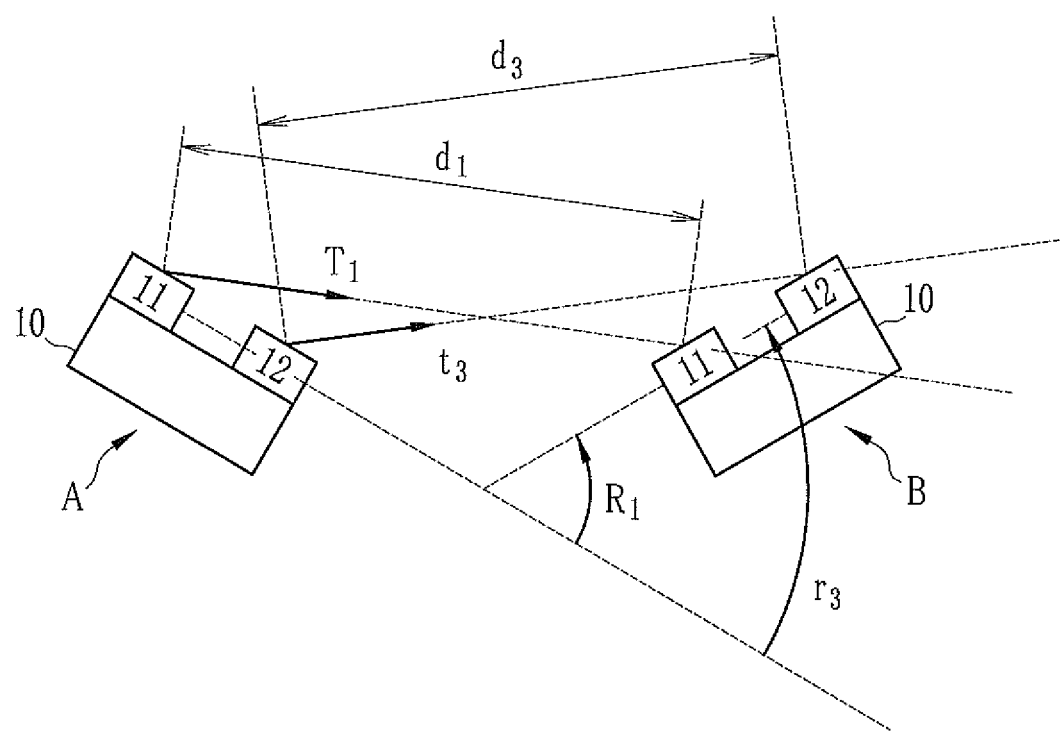
FIG. 18 is an explanatory view illustrating a rotation matrix $r_3$ and a translation matrix $t_3$.

Then, the virtual translation distance $d_1$, which is the same as that in S44, is assumed and a rotation matrix $r_3$, a translation matrix $t_3$, and a virtual translation distance $d_3$ are calculated (S46). As illustrated in FIG. 18, the virtual translation distance $d_3$ is a distance to the second imaging unit 12 at the second image capture position B from the second imaging unit 12 at the first image capture position A. The rotation matrix $r_3$ represents direction and angle of rotation of the second imaging unit 12 at the second image capture position B relative to the second imaging unit 12 at the first image capture position A. The translation matrix $t_3$ represents the translation direction (direction of the second imaging unit 12 at the second image capture position B relative to the second imaging unit 12 at the first image capture position A.)

Thereafter, the three-dimensional data is calculated by using the virtual translation distance $d_3$ (S47). In S47, the three-dimensional data, being the coordinates of the same point as that in S45 in the image $P_{AR}$ (or the image $P_{BR}$), is calculated by using the virtual translation distance $d_3$, instead of $D_1$, and the parallax between the image $P_{AR}$ and the image $P_{BR}$ as the parallax "w" in the mathematical expression 1. For example, in a case where the coordinates of the feature point $F_{10}$ in the real space are calculated in S45, the coordinates of the corresponding point $C_{10}$, which corresponds to the feature point $F_{10}$, in the real space are calculated in S47. The corresponding point may be detected in advance or during calculation of the three-dimensional data.

The three-dimensional data calculated based on the virtual translation distance $d_2$ is supposed be equivalent to the three-dimensional data calculated based on the virtual translation distance $d_3$ in the case where the assumed virtual translation distance $d_1$ is correct since virtual translation distances $d_2$ and $d_3$ are based on the same virtual translation distance $d_1$. For example, the coordinates of the feature point $F_{10}$ are supposed to be equivalent to the coordinates of the corresponding point $C_{10}$ in the case where the assumed virtual translation distance $d_1$ is correct since the feature point $F_{10}$ and the corresponding point $C_{10}$ are the same point in the real space. However, the three-dimensional data calculated based on the virtual translation distance $d_2$ differs from the three-dimensional data calculated based on the virtual translation distance $d_3$ even if the virtual translation distance $d_1$ is the same because different images are used for the respective calculations. The difference between the two pieces of three-dimensional data increases as the difference between the virtual translation distance $d_1$ and the true translation distance $D_1$ increases.

The translation distance calculator 25 calculates the difference between the three-dimensional data calculated based on the virtual translation distance $d_2$ and the three-dimensional data calculated based on the virtual translation distance $d_3$, and compares the difference with the predetermined threshold value (S48). In the case where the difference is less than or equal to the predetermined threshold value, the translation distance calculator 25 determines the virtual translation distance $d_1$ to be the true translation distance $D_1$, and uses the virtual translation distance $d_1$ to calculate the three-dimensional data (S43).

In the case where the difference between the three-dimensional data calculated based on the virtual translation distance $d_2$ and the three-dimensional data calculated based on the virtual translation distance $d_3$ is greater than the predetermined threshold value, the virtual translation distance $d_1$ is changed (S49). Then, the virtual translation distances $d_2$ and $d_3$, the three-dimensional data, and the like are recalculated.

As described above, the two pieces of three-dimensional data are calculated through the two types of calculations, in which different pairs of images are used, after the virtual translation distance $d_1$ is assumed. Then the two pieces of three-dimensional data are compared with each other. Thus, the translation distance $D_1$ is calculated even if the three-dimensional measurement apparatus 10 has not been rotated.

In the above example, the three-dimensional data is calculated with the use of the virtual translation distance $d_1$ (the true translation distance $D_1$) in the case where the difference between the three-dimensional data calculated based on the virtual translation distance $d_2$ and the three-dimensional data calculated based on the virtual translation distance $d_3$ is less than or equal to the predetermined threshold value. Instead of calculating three-dimensional data with the use of the virtual translation distance $d_1$ (the true translation distance $D_1$), note that the three-dimensional data calculated based on the virtual translation distance $d_2$ or the virtual translation distance $d_3$ may be used for display or the like.

In the case where the epipolar lines calculated based on the different virtual translation distances $d_1$ are substantially the same, S42 and S43 illustrated in FIG. 16 may be performed in different ways, which will be described below.

Figure 19:
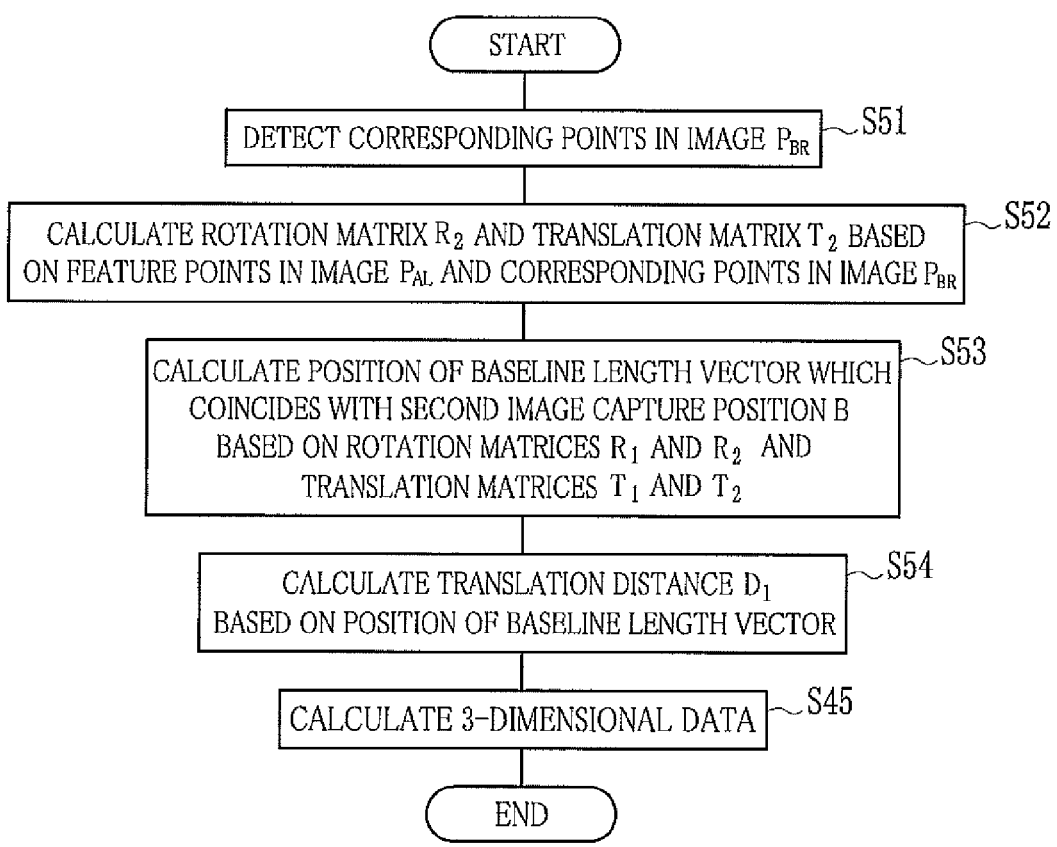
FIG. 19 is a flowchart illustrating another method for calculating the translation distance.
Figure 20:
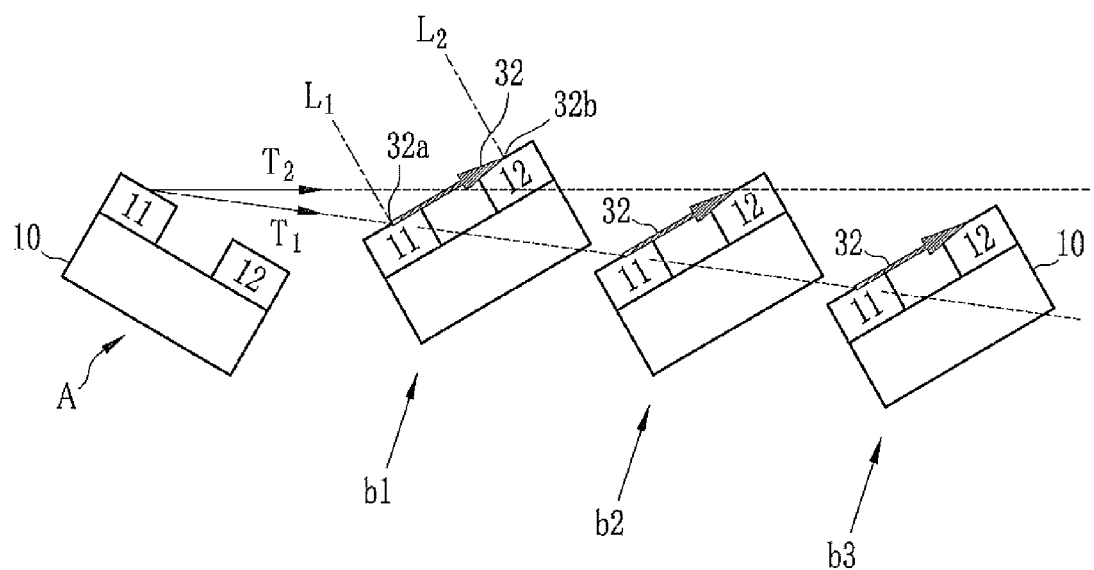
FIG. 20 is an explanatory view illustrating a principle of another method for calculating the translation distance.

As illustrated in FIG. 19, first, the corresponding points, which correspond to the feature points detected in the image $P_{AL}$ (S11 in FIG. 16), are detected in the image $P_{BR}$ (S51). The rotation matrix $R_2$ and the translation matrix $T_2$ are calculated based on the feature points in the image $P_{AL}$ and the corresponding points in the image $P_{BR}$ (S52). The rotation matrix $R_2$ and the translation matrix $T_2$ correspond to the rotation matrix $r_2$ and the translation matrix $t_2$ in FIG. 3, but do not contain assumption and are directly calculated from feature points in the image $P_{AL}$ and corresponding points in the image $P_{BR}$. The rotation matrix $R_2$ and the translation matrix $T_2$ represent correct direction and angle of rotation and correct translation direction of the second imaging unit 12 at the second image capture position B relative to the first imaging unit 11 at the first image capture position A. The translation distance $D_2$ is unknown, as with the above.

Next, the translation distance calculator 25 calculates the position of the baseline length vector which is coincident with the second image capture position B with the use of the rotation matrices $R_1$ and $R_2$ and the translation matrices $T_1$ and $T_2$ (S53).

A baseline length vector 32 has the size of the baseline length BL and the direction determined by the rotation matrices $R_1$ and $R_2$. An initial point 32a of the baseline length vector 32 is located on the first imaging unit 11 of the three-dimensional measurement apparatus 10 at the second image capture position B. A terminal point 32b of the baseline length vector 32 is located on the second imaging unit 12 of the three-dimensional measurement apparatus 10 at the second image capture position B.

The translation distance calculator 25 places the initial point 32a of the baseline length vector 32 on an arbitrary point on a straight line (hereinafter referred to as the direction $T_1$) extending in a direction indicated by the translation matrix $T_1$ from the first imaging unit 11 at the first image capture position A. The translation distance calculator 25 calculates a distance between the terminal point 32b and a straight line (hereinafter referred to as the direction $T_2$) extending in a direction indicated by the translation matrix $T_2$ from the first imaging unit 11 at the first image capture position A. The translation distance calculator 25 calculates the coordinates of the initial point 32a and the terminal point 32b of the baseline length vector 32 which make the distance between the direction (line) $T_2$ and the terminal point 32b minimum.

The direction $T_1$ represents a direction in which the first imaging unit 11 at the second image capture position B is located. The direction $T_2$ represents a direction in which the second imaging unit 12 at the second image capture position B is located. The distance between the directions (lines) $T_1$ and $T_2$ increases as the directions (lines) $T_1$ and $T_2$ become away from the first image capture position A, but the baseline length BL is invariable. Suppose the initial point 32a of the baseline length vector 32 is placed on an arbitrary point on the direction (line) $T_1$ and assume that the arbitrary point is the position of the first imaging unit 11 at the second image capture position, the terminal point 32b of the baseline length vector 32, which indicates the position of the second imaging unit 12 at the second image capture position B, is supposed to be on the direction (line) $T_2$ when the arbitrary point is the true second image capture position B. As illustrated by the characters b1 and b3, in a case where the initial point 32a of the baseline length vector 32 is placed too close or too far from the first image capture position A, the terminal point 32b is away from the direction $T_2$. The position at which the terminal point 32b becomes closest to the direction $T_2$ (ideally, the position at which the terminal point 32b is coincident with the direction $T_2$) is determined to be the second image capture position B by calculating the distance between the terminal point 32b and the direction $T_2$ while the position of the initial point 32a is moved along the direction $T_1$.

When the position of the second image capture position B is determined, the initial point 32a of the baseline length vector 32 is located on the first imaging unit 11 at the second image capture position B. The terminal point 32b of the baseline length vector 32 is located on the second imaging unit 12 at the second image capture position B. The translation distance calculator 25 calculates the distance from the first imaging unit 11 at the first image capture position A to the initial point 32a, thereby calculating the translation distance $D_1$ (S54). The translation distance calculator 25 calculates the distance from the first imaging unit 11 at the first image capture position A to the terminal point 32b, thereby calculating the translation distance $D_2$.

After the translation distance $D_1$ (and the translation distance $D_2$) are thus determined, the three-dimensional data calculator 28 calculates the three-dimensional data with the use of the translation distance $D_1$ (S54) and displays the calculated three-dimensional data (S43).

As described above, the rotation matrices $R_1$ and $R_2$ and the translation matrices $T_1$ and $T_2$ are used to calculate the position of the baseline length vector which is coincident with the second image capture position B. Thus, the translation distance $D_1$ is calculated correctly even if the three-dimensional measurement apparatus 10 is not rotated.

Figure 21:
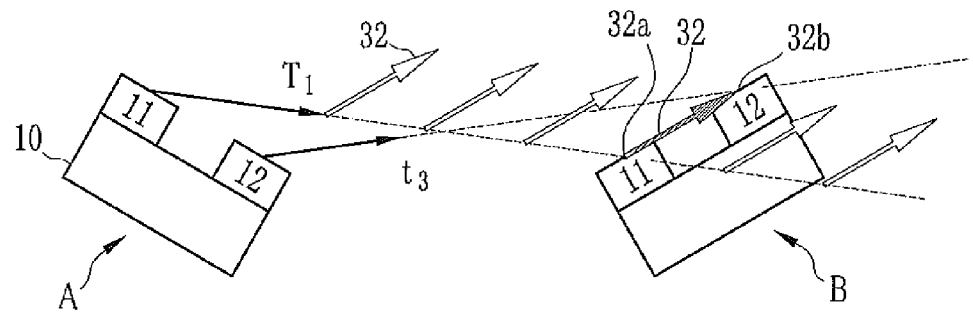
FIG. 21 is an explanatory view illustrating an example in which a $T_1$ direction and a $T_2$ direction cross each other.

In the above examples, the images $P_{AL}$ and $P_{BL}$ and the images $P_{AL}$ and $P_{BR}$ are used. Note that the images $P_{AL}$ and $P_{BL}$ and the images $P_{AR}$ and $P_{BR}$ may be used instead. In this case, as illustrated in FIG. 21, the direction (line) $T_1$ and the direction (line) $t_3$, which is calculated with the use of the images $P_{AR}$ and $P_{BR}$, cross each other, but the method for determining the second image capture position B based on the baseline length vector 32 is the same or similar to that described in the above examples.

In the fourth embodiment, the second image capture position B is determined by placing the initial point 32a of the baseline length vector 32 on the direction $T_1$ and calculating the distance between the terminal point 32b and the direction $T_2$. Note that the second image capture position B may be determined by placing the terminal point 32b on the direction $T_2$ and calculating the distance between the initial point 32a and the direction $T_1$. The initial point 32a and the terminal point 32b of the baseline length vector 32 may be defined reversely.

Fifth Embodiment

In the first to fourth embodiments, the virtual translation distance $d_1$ is an arbitrary value, but it is preferred that the virtual translation distance $d_1$ is close in value to the true translation distance $D_1$ to calculate the translation distance $D_1$ in a short time period.

Figure 22:
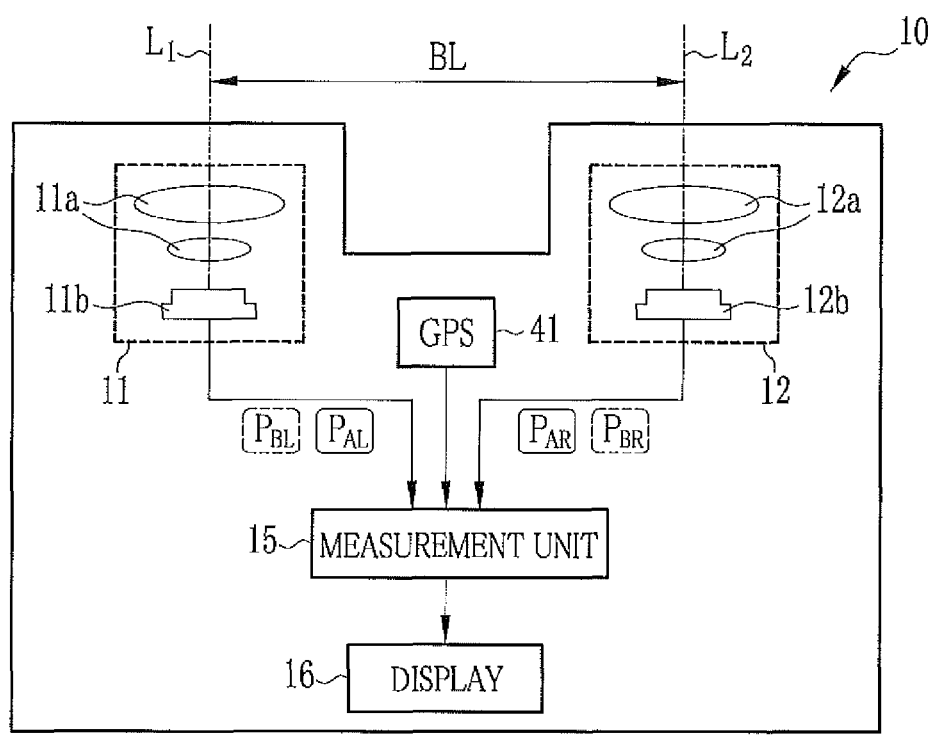
FIG. 22 is an explanatory view illustrating a three-dimensional measurement apparatus incorporating a GPS.

As illustrated in FIG. 22, the three-dimensional measurement apparatus 10 is provided with, for example, a GPS (image capture position detector) 41 to set the virtual translation distance $d_1$ close in value to the true translation distance $D_1$. Location information at the time of imaging, measured by the GPS 41, is stored in association with the images $P_{AL}$, $P_{AR}$, $P_{BL}$, and $P_{BR}$. For example, the location information of the first image capture position A is stored as EXIF data of the images $P_{AL}$ and $P_{AR}$. The second image capture position B is stored as EXIF data of the images $P_{BL}$ and $P_{BR}$.

Figure 23:
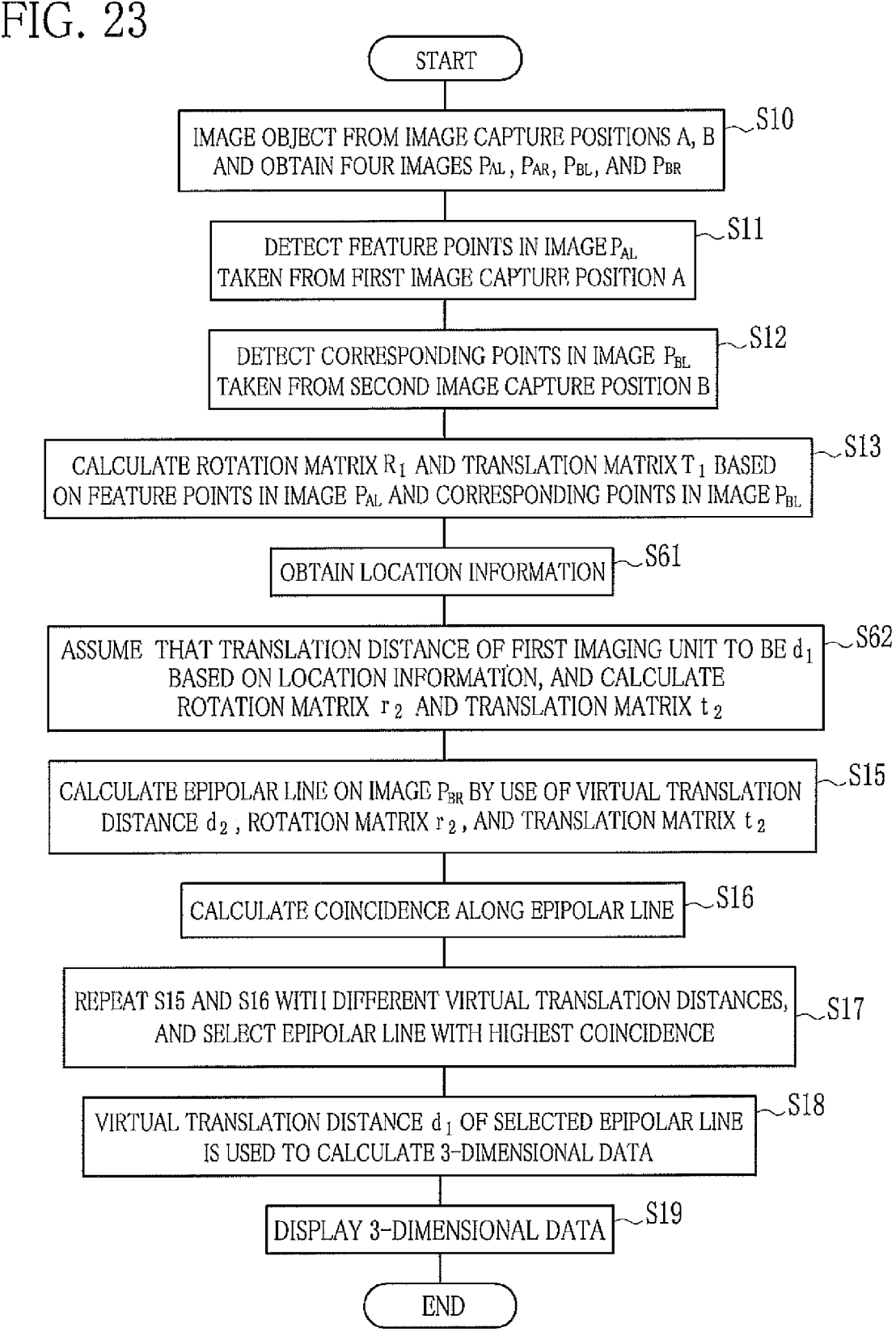
FIG. 23 is a flowchart illustrating a procedure of the three-dimensional measurement according to a fifth embodiment.

As illustrated in FIG. 23, in the case where the virtual translation distance $d_1$ is assumed to calculate the epipolar line after the rotation matrix $R_1$ and the translation matrix $T_1$ are calculated, the location information, which is stored in association with the images $P_{AL}$, $P_{AR}$, $P_{BL}$, and $P_{BR}$, is obtained (S61). The virtual translation distance $d_1$ is determined based on the obtained location information (S62). To be more specific, for example, an initial value of the virtual translation distance $d_1$ and a range within which the virtual translation distance $d_1$ varies are set close in value to the difference between the location information of the image $P_{AL}$ and the location information of the image $P_{BL}$.

The GPS 41 is capable of measuring the approximate position of the three-dimensional measurement apparatus 10 as a whole, and cannot provide accurate location information of each of the imaging units 11 and 12 at each of the image capture positions A and B, which is necessary for calculating the three-dimensional data. However, the time necessary for calculating the true translation distance $D_1$ is reduced by using the GPS 41 to determine the initial value of the virtual translation distance $d_1$ and the range within which the virtual translation distance $d_1$ varies.

In the fifth embodiment, the GPS 41 is used to measure the location information, which is used for determining the initial value of the virtual translation distance $d_1$ and the range within which the virtual translation distance $d_1$ varies. Note that any method for obtaining the location information may be used as long as the approximate location information of the first and second image capture positions A and B is obtained. For example, the initial value and the variation range may be specified by the input of a user.

In the fifth embodiment, the GPS 41 is used. Instead of using the GPS 41, the initial value of the virtual translation distance $d_1$ may be represented by $|BL| \times \epsilon/\gamma$ where $|BL|$ denotes the baseline length, $\epsilon$ denotes the difference between the pixel address of a given feature point in the image $P_{AL}$ and the pixel address of the corresponding point in the image $P_{BL}$, and $\gamma$ denotes the difference between the pixel address of the feature point (the same as the above-mentioned given feature point) in the image $P_{AL}$ and the pixel address of the corresponding point in the image $P_{AR}$. In other words, $\epsilon$ represents the parallax between the image $P_{AL}$ and the image $P_{BL}$, and $\gamma$ represents the parallax between the image $P_{AL}$ and the image $P_{AR}$.

The depth of the given feature point is represented by (baseline length/parallax)×(focal length/pixel pitch). The same feature points have the same depths, so that $(|BL|/\gamma)×$(focal length/pixel pitch) equals (translation distance/$\epsilon$)×(focal length/pixel pitch). The translation distance is represented substantially by $|BL|×\epsilon/\gamma$ in the case where the focal lengths or the pixel pitches are the same. Therefore the virtual translation distance $d_1$ is close in value to the true translation distance $D_1$ by setting the virtual translation distance $d_1$ to be $|BL|×\epsilon/\gamma$ as described above. Thereby, the true translation distance $D_1$ is calculated in a short time. The range within which the virtual translation distance $d_1$ varies may contain the value $|BL|×\epsilon/\gamma$.

The method described in the fifth embodiment is based on the method described in the first embodiment. Note that it is preferred that the initial value and the variation range of the virtual translation distance $d_1$ are determined based on the location information even if the three-dimensional data is calculated by using the methods described in the second, third, or fourth embodiment.

Note that, in the first to fifth embodiments, the rotation matrices $r_2$ and the translation matrices $t_2$ which correspond to different virtual translation distances $d_1$ are calculated in advance, and the epipolar lines which correspond to the respective virtual translation distances $d_1$ are calculated. Instead, an epipolar line may be calculated by using an arbitrary virtual translation distance $d_1$. Then, the virtual translation distance $d_1$ is changed and a new epipolar line is calculated. Changing the virtual translation distance $d_1$ and calculating the corresponding epipolar line are repeated to calculate the epipolar lines which correspond to the respective virtual translation distances $d_1$.

Figure 24:
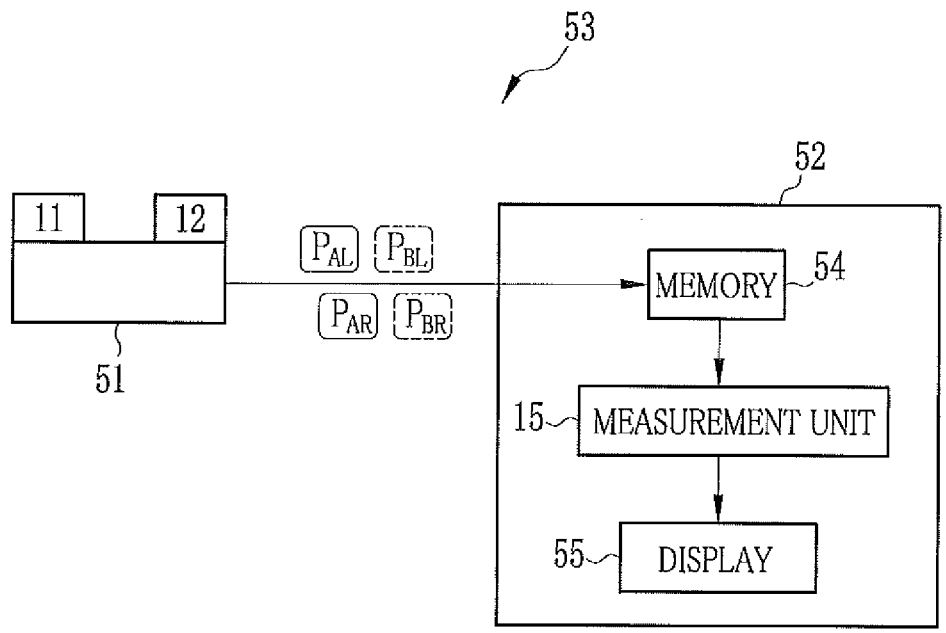
FIG. 24 is a block diagram illustrating the three-dimensional measurement system.

Note that, in the first to fifth embodiments, the three-dimensional measurement apparatus 10 comprises the first imaging unit 11 and the second imaging unit 12 and incorporates the measurement unit 15. The first imaging unit 11, the second imaging unit 12, and the measurement unit 15 may be separated from each other. As illustrated in FIG. 24, a three-dimensional measurement system 53 is composed of a stereo camera 51 and an image processing device 52. The stereo camera 51 comprises the first imaging unit 11 and the second imaging unit 12. The image processing device 52 comprises the measurement unit 15. The stereo camera 51 may have any configuration as long as the stereo camera 51 has two imaging units (the first imaging unit 11 and the second imaging unit 12) with the known baseline length BL. The image processing device 52 is, for example, a computer in which a CPU and various processing circuits constitute the measurement unit 15. In addition to the measurement unit 15, the image processing device 52 comprises, for example, an interface for receiving the images $P_{AL}$, $P_{AR}$, $P_{BL}$, and $P_{BR}$ from the stereo camera 51, a memory 54 for at least temporarily storing these images, and a display 55 for displaying the three-dimensional data calculated by the measurement unit 15.

Figure 25:
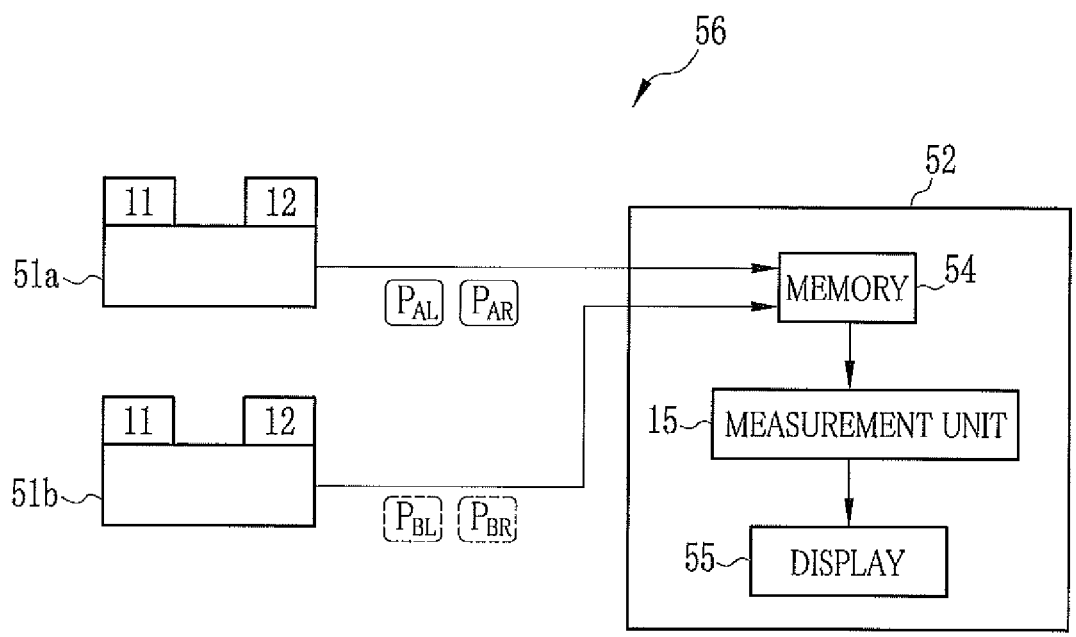
FIG. 25 is a block diagram illustrating the three-dimensional measurement system comprising two or more stereo cameras.

In the case where the three-dimensional measurement system is composed of the stereo camera and the image processing device, which are separate from each other, as described above, a three-dimensional measurement system 56 may be composed of two stereo cameras 51a and 51b and the image processing device 52 as illustrated in FIG. 25. The stereo camera 51a may be used to take the object from the first image capture position A. The stereo camera 51b may be used to take the object from the second image capture position B. The image processing device 52 is capable of calculating the three-dimensional data based on the images taken from the two image capture positions A and B with the separate stereo cameras 51a and 51b. It is preferred that the stereo cameras 51a and 51b are of the same model. The stereo cameras 51a and 51b of different models may be used as long as they have the same baseline length BL or the baseline length BL of one of the stereo cameras 51a and 51b is adjustable to the baseline length BL of the other. The three-dimensional measurement system may comprise three or more stereo cameras. In this case, the three-dimensional data is calculated by selectively using the images taken from two image capture positions out of the images taken from three image capture positions.

Figure 26:
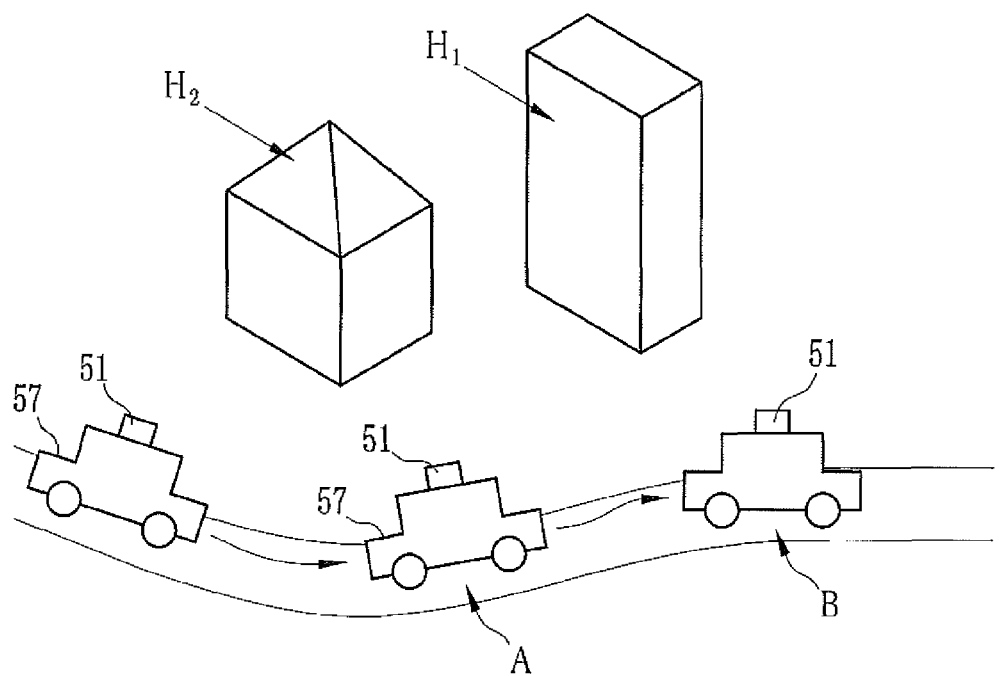
FIG. 26 is an explanatory view illustrating an example in which a vehicle-mounted camera is used as the stereo camera.

For the three-dimensional measurement apparatus 10 comprising the stereo camera 51 and the image processing device 52 separately, a vehicle-mounted camera may be used as the stereo camera 51 as illustrated in FIG. 26. In this case, images are taken while a car 57 moves around the objects $H_1$ and $H_2$. Then the taken images are transmitted to the image processing device 52, and the three-dimensional data of the objects $H_1$ and $H_2$ is calculated. By adopting the vehicle-mounted camera as the stereo camera 51, the three-dimensional data of the object is calculated easily and accurately, taking advantage of moving speed of the car 57. It is unnecessary to constitute the huge stereo camera, as described in the Japanese Patent Laid-Open Publication No. 2007-263669, for the vehicle-mounted stereo camera 51. Instead, the compact stereo camera 51 with the known baseline length BL is used. Furthermore, there is no need to precisely measure or calibrate the arrangement and the direction of the stereo camera 51. The stereo camera 51 is just mounted on the car 57 in a way that the stereo camera 51 can take images of the objects $H_1$ and $H_2$. In the case where the object is out of the overlapping imaging fields of the first and second imaging units 11 and 12 due to a direction of the car 57 or the like, the position and the direction of the stereo camera 51 is adjusted as necessary. The size of the car 57 and the direction of the road have no effect on imaging. There is no difficulty in adjusting the direction of the stereo camera. It is also possible to mount the entire three-dimensional measurement apparatus 10 including the measurement unit 15 on the car 57.

Note that, in the first to fifth embodiments, the baseline length BL of the three-dimensional measurement apparatus 10 is invariable. Alternatively, the baseline length may be changeable. In this case, however, all the images used for calculating the three-dimensional data must be taken at the same baseline length. The changed baseline length BL needs to be a known value in at least calculating the three-dimensional data. To maintain the accuracy of measuring the three-dimensional data, the changed baseline length BL needs to be measured precisely enough to calculate the three-dimensional data.

Note that, in the first to fifth embodiments, the imaging optical axes $L_1$ and $L_2$ of the first and second imaging units 11 and 12 are parallel. Alternatively, the first imaging unit 11 and the second imaging unit 12 may be tilted relative to each other such that the imaging optical axes $L_1$ and $L_2$ are not parallel. In this case, the calculation of the three-dimensional data becomes complicated. However, the basic principles are the same as those in the first to fifth embodiments.

Note that, in the above embodiments, the first imaging unit 11 and the second imaging unit 12 take the images simultaneously. However, the imaging timing of the first and second imaging units 11 and 12 may not necessarily be exactly the same. The first and second imaging units 11 and 12 may perform imaging sequentially, for example, in this order, as long as the first and second imaging units 11 and 12 perform the imaging at roughly the same time with the image capture positions and the inclination of the three-dimensional measurement apparatus 10 remaining constant or slightly moved within a negligible range.

Various changes and modifications are possible in the present invention and may be understood to be within the present invention.

What is claimed is:

1. A three-dimensional measurement apparatus comprising:
    a first imaging unit for imaging an object;
    a second imaging unit disposed at a predetermined baseline length from the first imaging unit, the second imaging unit imaging at least a part of the object imaged with the first imaging unit;
    a feature point detector for detecting a plurality of feature points in at least one of two images of the object taken from a first image capture position with the first and second imaging units;
    a corresponding point detector for detecting corresponding points in at least one of two images of the object taken from a second image capture position with the first and second imaging units, the second image capture position being different from the first image capture position, the corresponding points corresponding to the feature points;
    a rotation matrix calculator for calculating a rotation matrix representing angle and direction of rotation of the first or second imaging unit at the second image capture position relative to the first or second imaging unit at the first image capture position;
    a translation matrix calculator for calculating a translation matrix representing a translation direction of the first or second imaging unit at the second image capture position relative to the first or second imaging unit at the first image capture position;
    an epipolar line calculator for calculating an epipolar line based on a relative positional relationship between each of the imaging units at the first and second image capture positions, the relative positional relationship being determined by a first rotation matrix, a first translation matrix, and a first virtual translation distance, the first rotation matrix being calculated by the rotation matrix calculator based on the feature points and the corresponding points, the first translation matrix being calculated by the translation matrix calculator based on the feature points and the corresponding points, the first virtual translation distance being an arbitrarily assumed distance between each of the imaging unit taking the image in which the feature points are detected and the imaging unit taking the image in which the corresponding points are detected, the epipolar line being a projection of a direction of line of sight from the imaging unit at the first image capture position to the specific feature point onto the image taken from the second image capture position;
    an evaluator for evaluating whether each of the epipolar lines passes through the corresponding point corresponding to the feature point, the epipolar lines being calculated with the different first virtual translation distances; and
    a three-dimensional data calculator for calculating three-dimensional data of the object with the use of the first virtual translation distance assumed for calculating the epipolar line passing through the specific feature point.

2. The three-dimensional measurement apparatus according to claim 1, wherein the epipolar line calculator calculates the epipolar line based on a second rotation matrix, a second translation matrix, and a second virtual translation distance; the second rotation matrix represents angle and direction of rotation of the imaging unit, at the second image capture position, taking the image for calculating the epipolar line relative to the imaging unit, at the first image capture position, taking the image in which the feature points are detected; the second translation matrix represents a translation direction; and the second virtual translation distance represents a translation distance containing an assumption of the first virtual translation distance.

3. The three-dimensional measurement apparatus according to claim 1, wherein the evaluator calculates the coincidence with the feature point along the epipolar lines and evaluates, based on the coincidence, whether the epipolar line passes through the corresponding point corresponding to the feature point.

4. The three-dimensional measurement apparatus according to claim 3, wherein the three-dimensional data calculator calculates the three-dimensional data of the object with the use of the virtual translation distance assumed for calculating the epipolar line containing a point with the highest coincidence.

5. The three-dimensional measurement apparatus according to claim 1, wherein the corresponding point detector detects the corresponding point on the image for calculating the epipolar line, and the corresponding point corresponds to the specific feature point, through which the epipolar line is supposed to pass, and the evaluator evaluates whether the epipolar line passes through the corresponding point based on distances from the epipolar lines to the corresponding point corresponding to the specific feature point.

6. The three-dimensional measurement apparatus according to claim 1, wherein the rotation matrix calculator and the translation matrix calculator recalculate the first rotation matrix and the first translation matrix with a changed condition in a case where the evaluator evaluates that none of the epipolar lines passes through the corresponding point corresponding to the specific feature point.

7. The three-dimensional measurement apparatus according to claim 6, wherein the corresponding point detector redetects the corresponding points, and the rotation matrix calculator and the translation matrix calculator recalculate the first rotation matrix and the first translation matrix based on the redetected corresponding points.

8. The three-dimensional measurement apparatus according to claim 7, wherein the corresponding point detector changes the condition in a case where the corresponding points are redected, and changing the condition includes any one of changing size of the image containing the feature point used for detecting the corresponding point, changing a scaling factor, changing the angle of rotation, and changing a combination of the feature points used for detecting the corresponding points.

9. The three-dimensional measurement apparatus according to claim 6, wherein the feature point detector redetects the feature points, and the rotation matrix calculator and the translation matrix calculator recalculate the first rotation matrix and the first translation matrix based on the redetected feature points.

10. The three-dimensional measurement apparatus according to claim 1, wherein the three-dimensional data calculator calculates the three-dimensional data with a method not using the epipolar line in a case where the first rotation matrix indicates that the first image capture position and the second image capture position are not rotated.

11. The three-dimensional measurement apparatus according to claim 10, wherein the three-dimensional data calculator compares the three-dimensional data calculated based on the first virtual translation distance with the three-dimensional data calculated based on a third virtual translation distance representing a distance between the imaging units at the first and second image capture positions, different from the distance represented by the first virtual translation distance, and determined by an assumption of the first virtual translation distance, and
    calculates the first virtual translation distance and the three-dimensional data which make a difference between the three-dimensional data calculated using the first virtual translation distance and the three-dimensional data calculated using the third virtual translation distance less than or equal to a predetermined threshold value.

12. The three-dimensional measurement apparatus according to claim 10, wherein the three-dimensional data calculator uses the first rotation matrix and the first translation matrix calculated using the images of an arbitrary combination out of the four images taken from the first and second image capture positions and a third rotation matrix and a third translation matrix calculated using the images of a combination different from the images of the arbitrary combination, and
    determines a position of the baseline length vector having the baseline length and whose direction is determined by the first and third rotation matrices and whose initial point and terminal point are located on directions represented by the first and third translation matrices, respectively, and
    calculates the three-dimensional data based on the positions of the initial and terminal points located on the directions represented by the first and third translation matrices, respectively.

13. The three-dimensional measurement apparatus according to claim 1, further comprises an image capture position detector for detecting location information of the first image capture position and the second image capture position, and the epipolar line calculator determines an initial value of the first virtual translation distance or a range within which the first virtual translation distance varies, based on a distance between the first and second image capture positions calculated from the location information detected by the image capture position detector.

14. The three-dimensional measurement apparatus according to claim 1, wherein the epipolar line calculator determines an initial value of the first virtual translation distance or a range within which the first virtual translation distance varies, based on an expression $|BL| \times \epsilon/\gamma$ where $|BL|$ denotes the baseline length, $\epsilon$ denotes parallax between the image taken from the first image capture position and the image taken from the second image capture position, and $\gamma$ denotes parallax between the two images taken from the first image capture position.

15. The three-dimensional measurement apparatus according to claim 1, wherein the three-dimensional data is any of a distance between two points on the object, an angle between two points on the object, and three-dimensional model data of the object.

16. An image processing device comprising:
    a storage for storing images taken from each of first and second image capture positions with one or two stereo cameras, the stereo camera having a first imaging unit for imaging an object and a second imaging unit disposed at a distance of a predetermined baseline length from the first imaging unit, the second imaging unit imaging at least a part of the object imaged with the first imaging unit;
    a feature point detector for detecting a plurality of feature points in at least one of the two images of the object taken from the first image capture position with the first and second imaging units;
    a corresponding point detector for detecting corresponding points in at least one of the two images of the object taken from the second image capture position with the first and second imaging units, the second image capture position being different from the first image capture position, the corresponding points corresponding to the feature points;
    a rotation matrix calculator for calculating a rotation matrix representing angle and direction of rotation of the first or second imaging unit at the second image capture position relative to the first or second imaging unit at the first image capture position;
    a translation matrix calculator for calculating a translation matrix representing a translation direction of the first or second imaging unit at the second image capture position relative to the first or second imaging unit at the first image capture position;
    an epipolar line calculator for calculating an epipolar line based on a relative positional relationship between each of the imaging units at the first and second image capture positions, the relative positional relationship being determined based on a first rotation matrix, a first translation matrix, and a first virtual translation distance, the first rotation matrix being calculated by the rotation matrix calculator based on the feature points and the corresponding points, the first translation matrix being calculated by the translation matrix calculator based on the feature points and the corresponding points, the first virtual translation distance being an arbitrarily assumed distance between each of the imaging unit taking the image in which the feature points are detected and the imaging unit taking the image in which the corresponding points are detected, the epipolar line being a projection of a direction of line of sight from the imaging unit at the first image capture position to the specific feature point onto the image taken from the second image capture position;
    an evaluator for evaluating whether each of the epipolar lines passes through the corresponding point corresponding to the feature point, the epipolar lines being calculated with the different first virtual translation distances; and
    a three-dimensional data calculator for calculating three-dimensional data of the object with the use of the first virtual translation distance assumed for calculating the epipolar line passing through the specific feature point.

17. A three-dimensional measurement method comprising the steps of:
    detecting a plurality of feature points in at least one of two images of an object taken from a first image capture position with one or two stereo cameras, the stereo camera having a first imaging unit for imaging the object and a second imaging unit disposed at a distance of a predetermined baseline length from the first imaging unit, the second imaging unit imaging at least a part of the object imaged with the first imaging unit;
    detecting corresponding points that correspond to the feature points in at least one of two images of the object taken from a second image capture position with the first and second imaging units, the second image capture position being different from the first image capture position;

calculating a rotation matrix representing angle and direction of rotation of the first or second imaging unit at the second image capture position relative to the first or second imaging unit at the first image capture position;

calculating a translation matrix representing a translation direction of the first or second imaging unit at the second image capture position relative to the first or second imaging unit at the first image capture position;

calculating an epipolar line based on a relative positional relationship between each of the imaging units at the first and second image capture positions, the relative positional relationship being determined based on a first rotation matrix, a first translation matrix, and a first virtual translation distance, the first rotation matrix being calculated by a rotation matrix calculator based on the feature points and the corresponding points, the first translation matrix being calculated by a translation matrix calculator based on the feature points and the corresponding points, the first virtual translation distance being an arbitrarily assumed distance between each of the imaging unit taking the image in which the feature points are detected and the imaging unit taking the image in which the corresponding points are detected, the epipolar line being a projection of a direction of line of sight from the imaging unit at the first image capture position to the specific feature point onto the image taken from the second image capture position;

evaluating whether each of the epipolar lines passes through the corresponding point corresponding to the feature point, the epipolar lines being calculated with the different first virtual translation distances; and calculating three-dimensional data of the object with the use of the first virtual translation distance assumed for calculating the epipolar line passing through the specific feature point.

\* \* \* \* \*